US008492472B2

(12) United States Patent
Elizalde et al.

(10) Patent No.: US 8,492,472 B2
(45) Date of Patent: *Jul. 23, 2013

(54) POLYMER DISPERSIONS FOR CORROSION CONTROL

(75) Inventors: Oihana Elizalde, Charlotte, NC (US); Stephan Amthor, Ludwigshafen (DE); Jens Hartig, Ludwigshafen (DE)

(73) Assignee: BASF SE, Ludwigshafen (DE)

(*) Notice: Subject to any disclaimer, the term of this patent is extended or adjusted under 35 U.S.C. 154(b) by 189 days.

This patent is subject to a terminal disclaimer.

(21) Appl. No.: 12/968,648

(22) Filed: Dec. 15, 2010

(65) Prior Publication Data

US 2011/0245401 A1 Oct. 6, 2011

Related U.S. Application Data

(60) Provisional application No. 61/287,720, filed on Dec. 18, 2009.

(51) Int. Cl.
C08F 2/16 (2006.01)
C08K 3/20 (2006.01)
C08L 11/02 (2006.01)

(52) U.S. Cl.
USPC .......... 524/458; 427/385.5; 427/388.1; 523/201; 524/460; 524/515; 524/517; 524/521; 524/523

(58) Field of Classification Search
USPC .......... 523/201; 524/458, 515, 523, 460, 524/517, 521; 427/385.5, 388.1
See application file for complete search history.

(56) References Cited

U.S. PATENT DOCUMENTS

| | | | |
|---|---|---|---|
| 3,804,881 A | 4/1974 | Bassett et al. | |
| 3,957,711 A | 5/1976 | Powanda et al. | |
| 4,596,678 A | 6/1986 | Merger et al. | |
| 4,596,679 A | 6/1986 | Hellbach et al. | |
| 5,087,739 A | 2/1992 | Bohmholdt et al. | |
| 6,391,973 B1 | 5/2002 | Law et al. | |
| 7,317,056 B2 | 1/2008 | Yoshimura et al. | |
| 7,816,441 B2 | 10/2010 | Elizalde et al. | |
| 2001/0056154 A1* | 12/2001 | Blum et al. | 524/522 |
| 2003/0050385 A1* | 3/2003 | Probst et al. | 524/505 |
| 2005/0245661 A1* | 11/2005 | Kodama et al. | 524/457 |
| 2006/0247357 A1 | 11/2006 | Willems et al. | |
| 2010/0093905 A1 | 4/2010 | Elizalde et al. | |

FOREIGN PATENT DOCUMENTS

| | | |
|---|---|---|
| DE | 100 13 186 A1 | 9/2001 |
| DE | 100 13 187 A1 | 10/2001 |
| EP | 0 126 299 A1 | 11/1984 |
| EP | 0 126 300 A1 | 11/1984 |
| EP | 0 355 443 A2 | 2/1990 |
| EP | 0 853 636 B1 | 5/2000 |
| EP | 1 602 701 A1 | 12/2005 |
| JP | 2007-45948 | 2/2007 |
| WO | WO 00/05276 | 2/2000 |
| WO | WO 02/08297 A2 | 1/2002 |
| WO | WO 2005/087828 A1 | 9/2005 |
| WO | WO 2006/054611 A1 | 5/2006 |
| WO | WO 2006/118974 A1 | 11/2006 |
| WO | WO 2008/068198 A1 | 6/2008 |
| WO | WO 2011/009838 A2 | 1/2011 |

OTHER PUBLICATIONS

International Search Report issued Jul. 15, 2011, in Patent Application No. PCT/EP2010/069616 (with English Translation of Category of Cited Documents).
U.S. Appl. No. 12/991,623, filed Nov. 8, 2010, Balk, et al.
European Search Report issued Mar. 24, 2010, in Patent Application No. EP 09 17 9971 (with English Translation of Category of Cited Documents).
E. P. Pedraza, et al., "Effect of functional monomer on the stability and film properties of thermosetting core-shell latexes", Polymer, vol. 46, No. 24, 2005, pp. 11174-11185.
Ganghua Teng, et al., "Effect of Introduction Mode of Hydroxyl Functionality on Morphology and Film Properties of Cycloaliphatic Diepoxide Crosslinkable Core-Shell Latex", Journal of Polymer Science: Part A: Polymer Chemistry, vol. 40, 2002, pp. 4256-4265.
U.S. Appl. No. 13/384,607, filed Jan. 18, 2012, Balk, et al.

* cited by examiner

*Primary Examiner* — David W Wu
*Assistant Examiner* — Marie Reddick
(74) *Attorney, Agent, or Firm* — Oblon, Spivak, McClelland, Maier & Neustadt, L.L.P.

(57) ABSTRACT

The present invention relates to coating compositions which comprise dispersions of polymers obtained by a multistage procedure, to processes for preparing them, and to their use in corrosion protection.

16 Claims, No Drawings

POLYMER DISPERSIONS FOR CORROSION CONTROL

The present invention relates to coating compositions which comprise dispersions of polymers obtained by a two-stage procedure, to processes for preparing them, and to their use in corrosion control.

U.S. Pat. No. 3,957,711 describes single-stage polymers having a hydroxyalkyl(meth)acrylate as protective colloid, which is prepared in situ and followed by the polymerization of other monomers.

U.S. Pat. No. 7,317,056 describes polymers prepared by a two-stage procedure and intended for pressure-sensitive adhesives, the first stage of the procedure involving the incorporation, by polymerization, of a high fraction of acrylic acid and hydroxyalkyl acrylates. The prepared by the process described therein exhibit a high viscosity, and this necessitates a reduction in the solids fraction of the completed dispersion.

E. P. Pedraza and M. D. Soucek in Polymer (2005), 46(24), 11174-85 described latices composed of core-shell polymers whose core is composed of (meth)acrylates and hydroxyethyl methacrylate and whose shell is composed of (meth)acrylates and methacrylic acid. The polymerization yields large particles having an average size of more than 300 nm and in some cases a bimodal particle-size distribution.

A disadvantage is that, according to the teaching of that paper, a high fraction of more than 4% of emulsifiers is necessary, based on the sum of the monomers employed.

G. Teng and M. D. Soucek in Journal of Polymer Science: Part A: Polymer Chemistry, Vol. 40, 4256-4265 (2002) describe latices composed of core-shell polymers whose cores and shells are each composed either of (meth)acrylates or of (meth)acrylates and hydroxyethyl methacrylate. The polymerization yields large particles having an average size of more than 250 nm.

A disadvantage here again is that, according to the teaching of that paper, a high fraction of more than 4% of emulsifiers is needed, based on the sum of the monomers employed.

EP 1602701 A1 describes the polymerization of monomers in the presence of a protective colloid which is prepared from certain hydrophobic and hydrophilic monomers. A disadvantage is that, according to the teaching of that specification, a high fraction of more than 40% of hydrophilic monomers is used for the polymerization, leading to polymers having only a low level of water stability.

WO 00/5276 describes polymers prepared by a two-stage procedure in whose first stage a high fraction of acrylic acid is incorporated by polymerization. The viscosity of the prepared by the process described therein is high, necessitating a reduction in the solids fraction of the completed dispersion.

It was an object of the present invention to provide polymer dispersions for coating compositions which can be prepared if possible without an emulsifier or with only just a small amount of emulsifier, exhibit reduced viscosity, and lead to coatings having improved water stability.

This object has been achieved by means of a coating composition comprising at least one polymer dispersion obtainable by at least two-stage emulsion polymerization of in a first stage, reaction of
(A1) at least one alkyl(meth)acrylate,
(B1) optionally at least one vinylaromatic having up to 20 C atoms,
(C1) at least one hydroxyalkyl(meth)acrylate,
(D1) optionally at least one free-radically polymerizable compound selected from the group consisting of ethylenically unsaturated nitriles having up to 20 C atoms, vinyl esters of carboxylic acids containing up to 20 C atoms, vinyl halides having up to 10 C atoms, and vinyl ethers of alcohols containing 1 to 10 C atoms,
(E1) optionally at least one $\alpha,\beta$-ethylenically unsaturated carboxylic acid,
(F1) optionally at least one crosslinker,
(G1) optionally at least one compound selected from the group consisting of 2-(2-oxoimidazolidin-1-yl)ethyl meth(acrylate) (ureidoethyl(meth)acrylate), acetoacetoxyethyl acrylate, acetoacetoxypropyl methacrylate, acetoacetoxybutyl methacrylate, 2-(acetoacetoxy)ethyl methacrylate, diacetoneacrylamide (DAAM), and diacetonemethacrylamide,
(H1) optionally at least one compound having a (meth)acrylate group and an epoxy group, and
(I1) optionally at least one $\alpha,\beta$-ethylenically unsaturated carboxamide, in the presence of at least one initiator and optionally in the presence of at least one emulsifier and also, optionally, in the presence of at least one regulator,
with the proviso that the copolymer obtained from the first stage has
an acid number of not more than 10 mg KOH/g polymer,
a hydroxyl number of 2 to 100 mg KOH/g polymer,
a particle size of 20 to 350, preferably 30 to 200 nm, and
a weight-average molecular weight of 5000 to 200 000 g/mol,
and the sum of the monomers (C1) and (I1) is from 0.5% to 20% by weight,
followed by a free-radical polymerization, in a subsequent stage, in the presence of the copolymer prepared in the first stage, of
(A2) at least one alkyl(meth)acrylate,
(B2) optionally at least one vinylaromatic having up to 20 C atoms,
(C2) optionally at least one hydroxyalkyl(meth)acrylate,
(D2) optionally at least one free-radically polymerizable compound selected from the group consisting of ethylenically unsaturated nitriles having up to 20 C atoms, vinyl esters of carboxylic acids containing up to 20 C atoms, vinyl halides having up to 10 C atoms, and vinyl ethers of alcohols containing 1 to 10 C atoms,
(E2) optionally at least one $\alpha,\beta$-ethylenically unsaturated carboxylic acid,
(F2) optionally at least one crosslinker, and
(G2) optionally at least one compound selected from the group consisting of 2-(2-oxoimidazolidin-1-yl)ethyl meth(acrylate) (ureidoethyl(meth)acrylate), acetoacetoxyethyl acrylate, acetoacetoxypropyl methacrylate, acetoacetoxybutyl methacrylate, 2-(acetoacetoxy)ethyl methacrylate, diacetoneacrylamide (DAAM), and diacetonemethacrylamide,
(H2) optionally at least one compound having a (meth)acrylate group and an epoxy group, and
(I2) optionally at least one $\alpha,\beta$-ethylenically unsaturated carboxamide,
optionally followed by one or more further stages of a free-radical polymerization of at least one monomer,
the amount of the at least one emulsifier being 0% to 3.5% by weight, based on the total amount of the free-radically polymerizable monomers metered into the free-radical polymerization in all the stages,
with the proviso that
the weight ratio of the sum of the monomers of the first stage (A1) to (I1) to the sum of the monomers of the subsequent stages (A2) to (I2) is from 5:95 to 70:30,
the product obtained from the last stage has a particle size of 50 to 500 nm,
the acid number of the product of the last stage is not higher than the acid number of the product of the first stage, and the hydroxyl number of the product of the last stage is not higher than the hydroxyl number of the product of the first stage.

In the polymerization it is possible in accordance with the invention to use the following monomers:

alkyl(meth)acrylates (A1) and (A2)

These include preferably those alkyl(meth)acrylates whose linear or branched alkyl radical has 1 to 20 carbon atoms, more preferably 1 to 10, very preferably 1 to 8, and more particularly 1 to 4 carbon atoms.

Examples of alkyl(meth)acrylates include methyl(meth) acrylate, ethyl(meth)acrylate, n-propyl(meth)acrylate, n-butyl(meth)acrylate, isobutyl(meth)acrylate, sec-butyl(meth) acrylate, n-pentyl(meth)acrylate, isopentyl(meth)acrylate, 2-methylbutyl(meth)acrylate, amyl(meth)acrylate, n-hexyl (meth)acrylate, 2-ethylbutyl(meth)acrylate, pentyl(meth) acrylate, n-heptyl(meth)acrylate, n-octyl(meth)acrylate, 2-ethylhexyl(meth)acrylate, 2-propylheptyl(meth)acrylate, n-decyl(meth)acrylate, undecyl(meth)acrylate, and n-dodecyl(meth)acrylate.

Preference is given to methyl methacrylate, methyl acrylate, ethyl acrylate, n-butyl acrylate, n-hexyl acrylate, n-octyl acrylate, 2-ethylhexyl acrylate, and 3-propylheptyl acrylate.

In particular, mixtures of the alkyl(meth)acrylates are also suitable.

Vinylaromatics having up to 20 C atoms (B1) and (B2)

These are optionally substituted aromatic systems having a vinyl group located in conjugation to the aromatic ring system.

Such substituted vinylaromatics have one or more, preferably one, linear or branched alkyl group which has 1 to 10 carbon atoms, preferably 1 to 6 and more preferably 1 to 4 carbon atoms, and may be located on the aromatic moiety or on the vinyl group. Where the substituent is located on the aromatic moiety, it may be located preferably in ortho- or para-position, more preferably in para-position, relative to the vinyl group.

Vinylaromatics contemplated include vinyltoluene, vinylnaphthalene, α- and p-methylstyrene, α-butylstyrene, 4-n-butylstyrene, 4-n-decylstyrene, and—preferably—styrene and α-methylstyrene.

Hydroxyalkyl(meth)acrylate (C1) and (C2)

The hydroxyalkyl(meth)acrylates are those (meth)acrylic esters whose alkylene group comprises one to 10, preferably 2 to 8, more preferably 2 to 6, very preferably 2 to 4, and more particularly 2 or 3 carbon atoms.

Preferred hydroxyalkyl(meth)acrylates are, for example, 2-hydroxyethyl(meth)acrylate, 2-hydroxypropyl(meth)acrylate, 3-hydroxypropyl(meth)acrylate, and 4-hydroxybutyl (meth)acrylate.

Particular preference is given to 2-hydroxyethyl(meth) acrylate and 2-hydroxypropyl(meth)acrylate, and very particular preference to 2-hydroxyethyl(meth)acrylate.

Consideration may also be given to those hydroxyalkyl (meth)acrylates which have more than one hydroxyl group, such as, for example, two to five, preferably two to four, more preferably two to three. Examples thereof are glyceryl mono (meth)acrylate, trimethylolpropane mono(meth)acrylate, pentaerythritol mono(meth)acrylate, and mono(meth)acrylates of sugar alcohols, such as sorbitol, mannitol, diglycerol, threitol, erythritol, adonitol (ribitol), arabitol (lyxitol), xylitol, dulcitol (galactitol), maltitol, and isomalt, for example.

Free-radically polymerizable compound (D1) and (D2)

The compounds (D1) and (D2) are selected from the group consisting of ethylenically unsaturated nitriles having up to 20 C atoms, vinyl esters of carboxylic acids containing up to 20 C atoms, vinyl halides having up to 10 C atoms, and vinyl ethers of alcohols containing 1 to 10 C atoms, and are preferably selected from the group consisting of ethylenically unsaturated nitriles having up to 20 C atoms, and vinyl ethers of alcohols comprising 1 to 10 C atoms, and more preferably are ethylenically unsaturated nitriles having up to 20 C atoms.

Ethylenically unsaturated nitriles having up to 20 C atoms

Examples of ethylenically unsaturated nitriles are fumaronitrile, acrylonitrile, and methacrylonitrile, preferably acrylonitrile and methacrylonitrile, and more preferably acrylonitile.

Vinyl esters of carboxylic acids containing up to 20 C atoms

Vinylesters of carboxylic acids having 1 to 20 C atoms are, for example, vinyl laurate, vinyl stearate, vinyl propionate, Versatic acid vinyl esters, vinyl butyrate, and vinyl acetate, preferably vinyl acetate.

Vinyl halides having up to 10 C atoms

The vinyl halides are chloro-, fluoro- or bromo-substituted ethylenically unsaturated compounds, preferably vinyl chloride and vinylidene chloride.

Vinyl ethers of alcohols comprising 1 to 10 C atoms

Examples of vinyl ethers include methyl vinyl ether, ethyl vinyl ether, n-propyl vinyl ether, isopropyl vinyl ether, n-butyl vinyl ether, sec-butyl vinyl ether, isobutyl vinyl ether, tert-butyl vinyl ether, and n-octyl vinyl ether. Preference is given to vinyl ethers of alcohols comprising 1 to 4 C atoms.

α,β-Ethylenically unsaturated carboxylic acids (E1) and (E2)

These are α,β-ethylenically unsaturated carboxylic acids having 3 to 10, preferably 3 to 6, more preferably 3 to 4 carbon atoms.

Preference is given to (meth)acrylic acid, crotonic acid or dicarboxylic acids, e.g., itaconic acid, maleic acid or fumaric acid, more preferably methacrylic acid and acrylic acid.

(Meth)acrylic acid in this description stands for methacrylic acid and acrylic acid.

Crosslinkers (F1) and (F2)

Crosslinkers are those which have at least two free-radically polymerizable double bonds, preferably 2 to 6, more preferably 2 to 4, very preferably 2 to 3, and more particularly just 2.

Examples of di- and poly(meth)acrylates include 1,2-, 1,3-, and 1,4-butanediol diacrylate, 1,2- and 1,3-propylene glycol (meth)acrylate, 1,6-hexanediol di(meth)acrylate, 1,2-ethylene glycol di(meth)acrylate, neopentyl glycol di(meth)acrylate, diethylene glycol di(meth)acrylate, triethylene glycol di(meth)acrylate, tetraethylene glycol di(meth)acrylate, trimethylolpropane tri(meth)acrylate, trimethylolethane tri (meth)acrylate, and pentaerythritol tri- and tetra(meth)acrylate.

Mention may further be made of divinylbenzene.

Particular preference is given to the crosslinkers selected from the group consisting of divinylbenzene, 1,4-butanediol diacrylate, and allyl methacrylate.

If compounds (F1) and (F2) are used, they are employed preferably in the second stage and not in the first stage; in other words, if the amount of ((F1)+(F2))≠0, then preferably the amount of (F2)≠0 and (F1)=0.

Compounds (G1) and (G2) are selected from the group consisting of 2-(2-oxo-imidazolidin-1-yl)ethyl(meth)acrylate (ureidoethyl(meth)acrylate), N-[2-(2-oxo-oxazolidin-3-yl)ethyl]methacrylate, acetoacetoxyethyl acrylate, acetoacetoxypropyl methacrylate, acetoacetoxybutyl methacrylate, 2-(acetoacetoxy)ethyl methacrylate, diacetoneacrylamide (DAAM), and diacetonemethacrylamide.

Preference is given to 2-(2-oxo-imidazolidin-1-yl)ethyl (meth)acrylate, (acetoacetoxy)ethyl methacrylate, and diacetoneacrylamide, particular preference to 2-(2-oxo-imidazo-lidin-1-yl)ethyl(meth)acrylate and (acetoacetoxy)ethyl methacrylate, and very particular preference to diacetoneacrylamide.

If compounds (G1) and (G2) are used, they are employed preferably in the first stage and not in the second stage; in other words, if the amount of ((G1)+(G2))≠0, then preferably the amount of (G1)≠0 and (G2)=0.

(H1) and (H2)

These compounds comprise at least one compound having a (meth)acrylate group and an epoxy group. Mention may be made more particularly of glycidyl acrylate and glycidyl methacrylate, preferably glycidyl methacrylate.

(I1) and (I2)

These compounds comprise at least one α,β-ethylenically unsaturated carboxamide, preferably an amide of the carboxylic acids identified under (C1) and (C2).

Particular preference is given to (meth)acrylamide, crotonamide or amides of dicarboxylic acids, e.g., itaconamide, maleimide or fumaramide, more preferably methacrylamide and acrylamide, and very preferably acrylamide.

If compounds (I1) and (I2) are used, they are employed preferably in the first stage and not in the second stage; in other words, if the amount of ((I1)+(I2))≠0, then preferably the amount of (I1)≠0 and (I2)=0.

It is possible additionally, in minor amounts, as for example at less than 5% by weight, preferably less than 3% by weight, more preferably less than 1% by weight, and especially preferably 0% by weight, to use monomers other than those set out above, although this is less preferred.

The monomer composition of the first stage is generally as follows:

(A1) 30% to 99.5%, preferably 40% to 99%, more preferably 50% to 97% by weight of at least one alkyl(meth)acrylate, (B1) 0% to 70%, preferably 5% to 60%, more preferably 10% to 50% by weight of at least one vinylaromatic having up to 20 C atoms, (C1) 0.5% to 20%, preferably 1% to 15%, more preferably 3% to 10% by weight of at least one hydroxyalkyl(meth)acrylate, (D1) 0% to 20%, preferably 0% to 10%, more preferably 0% to 5%, and very preferably 0% by weight of at least one free-radically polymerizable compound selected from the group consisting of ethylenically unsaturated nitriles having up to 20 C atoms, vinyl esters of carboxylic acids comprising up to 20 C atoms, vinyl halides having up to 10 C atoms, and vinyl ethers of alcohols comprising 1 to 10 C atoms, and (E1) 0% to 5%, preferably 0% to 3%, more preferably 0% to 1%, very preferably 0% to 0.5%, and more particularly 0% by weight of at least one α,β-ethylenically unsaturated carboxylic acid, (F1) 0% to 20%, preferably 0% to 10%, more preferably 0% to 5%, and very preferably 0% by weight (G1) 0% to 20%, preferably 0% to 10%, more preferably 0% to 5%, and very preferably 0% by weight (H1) 0% to 20%, preferably 0% to 10%, more preferably 0% to 5%, and very preferably 0% by weight (I1) 0% to 19.5%, preferably 0% to 10%, more preferably 0% to 5%, and very preferably 0% by weight and the sum, based on the monomers used in the first stage, is always 100% by weight, and the amount of monomer (E1) is such that the polymer obtained from the first stage has an acid number of not more than 10 mg KOH/g, preferably not more than 8, more preferably not more than 5, very preferably not more than 3, more particularly not more than 1 mg KOH/g, and especially of 0 mg KOH/g, with the proviso that the sum of the monomers (C1) and (I1) is from 0.5% to 20% by weight, preferably from 0.5% to 15%, more preferably from 0.5% to 10%, and very preferably from 1% to 10% by weight.

The acid number in this specification, unless indicated otherwise, is determined in accordance with DIN EN ISO 3682 (potentiometrically).

The hydroxyl number of the polymer obtained from the first stage is from 2 to 100 mg KOH/g, preferably from 5 to 80 and more preferably from 8 to 60 mg KOH/g.

The hydroxyl number in this specification, unless indicated otherwise, is determined in accordance with DIN 53240-2 (potentiometrically, with an acetylation time of 20 minutes).

The particle size of the polymer obtained from the first stage is generally from 20 to 80 nm, preferably 30 to 60 nm if working in the presence of at least one emulsifier.

If, on the other hand, no emulsifier is present, the particle size can be up to 350, preferably up to 300, more preferably up to 250 and most preferably up to 200 nm.

Particle size for the purposes of this specification refers to the weight-average diameter of the polymer particles in the dispersion (determined in accordance with ISO13321 using a High Performance Particle Sizer from Malvern at 22° C. and a wavelength of 633 nm).

The weight-average molecular weight Mw of the polymer obtained from the first stage is from 5000 to 200 000 g/mol, preferably from 7000 to 100 000, more preferably from 8000 to 50 000, and very preferably from 10 000 to 30 000.

In this specification, the weight-average molecular weight Mw, unless indicated otherwise, is determined via a size exclusion chromatography (SEC) procedure with tetrahydrofuran+0.1% by weight of trifluoroacetic acid as eluent, with a flow rate of 1 ml/min and a column temperature of 35° C. The sample is diluted in the eluent to a concentration of 2 mg/ml, and 100 µl thereof are injected after the sample solution has been filtered through a 0.2 µm filter (Sartorius Minisart SRP 25) in order to remove any gel fraction. For the columns, three columns with an internal diameter of 7.5 mm were combined as follows: 5 cm preliminary column (Plgel 10µ Guard preliminary column), followed by two 30 cm separating columns (each Plgel 10µ Mixed B). Detection took place using an Agilent 1100 differential refractometer and Agilent 1100 VWD UV photometer, PSS SLD7000-BI-MwA (UV/254 nm/Agilent). Calibration was carried out with narrow-range polystyrene standards from Polymer Laboratories with molecular weights of M=580 to M=7 500 000, and also hexylbenzene (M=162). The values outside the elution range were extrapolated.

The filtration which precedes the determination of molecular weight removes any gel fraction in the polymer, and so the figures reported relate to the sol fraction.

The insoluble fraction of the polymer can be determined by four-hour extraction with tetrahydrofuran in a Soxhlet apparatus, followed by drying of the residue to constant weight, and weighing of the residue that remains.

After the first stage, the monomers used have undergone reaction to an extent of at least 90%, preferably at least 95%, and more preferably at least 98%.

The monomer feed to the second stage and optionally further, subsequent stages is generally as follows:

(A2) 1% to 100%, preferably 2% to 95%, more preferably 5% to 90% by weight, very preferably 10% to 80% by weight, of at least one alkyl(meth)acrylate, (B2) 0% to 70%, preferably 0% to 60%, more preferably 0% to 50% by weight of at least one vinylaromatic having up to 20 C atoms, (C2) 0% to 20%, preferably 0% to 15%, more preferably 0% to 10% by weight of at least one hydroxyalkyl(meth)acrylate, (D2) 0% to 40%, preferably 0% to 30%, more preferably 0% to 25%, and very preferably 0% to 20% by weight of at least one free-radically polymerizable compound selected from the group consisting of ethylenically unsaturated nitriles having up to 20 C atoms, vinyl esters of carboxylic acids comprising up to 20 C atoms, vinyl halides having up to 10 C atoms, and vinyl ethers of alcohols comprising 1 to 10 C atoms, and (E2) 0% to 5%, preferably 0% to 3%, more preferably 0% to 1%, very preferably 0% to 0.5%, and more particularly 0% by weight of at least one $\alpha,\beta$-ethylenically unsaturated carboxylic acid, (F2) 0% to 3.5% by weight, preferably 0% to 2.5%, more preferably 0% to 1.5%, and very preferably 0% to 1% by weight of at least one crosslinker, and (G2) 0% to 10%, preferably 1% to 10%, more preferably 2% to 10%, very preferably 5% to 10% by weight, (H2) 0% to 20%, preferably 0% to 10%, more preferably 0% to 5%, and very preferably 0% by weight (I2) 0% to 20%, preferably 0% to 10%, more preferably 0% to 5%, and very preferably 0% by weight and the sum, based on the monomers metered into second and further stages, is always 100% by weight.

The weight ratio of the sum of the monomers of the first stage (A1) to (I1) to the sum of the monomers of the second and further stage (A2) to (I2) is from 5:95 to 70:30, preferably from 10:90 to 70:30, more preferably from 20:80 to 65:35, very preferably from 30:70 to 60:40, and more particularly from 40:60 to 60:40.

The second stage may optionally be followed by one or more stages of a free-radical polymerization with one or more of the monomers (A2) to (I2).

The product obtained from the last stage generally has a particle size of 50 to 350 nm, preferably of 60 to 250, more preferably of 70 to 200 nm, if working in the presence of at least one emulsifier.

The particle size of the polymer obtained from the last stage can be up to 500 nm, preferably up to 400 nm, when operating in the absence of emulsifiers.

The increase in the diameter of the particles from the first to the second stage is dependant on the copolymerized monomer quantities of the first and second stages. Generally speaking, the growth in diameter of the particles from the first to the second stage will be from 5% to 50%, preferably from 10% to 40%, more preferably from 20% to 35%, very preferably from 25% to 35%, and more particularly around 30%.

The product obtained from the last stage generally has a weight-average molecular weight Mw, based on the sol fraction, of 50 000 to 300 000 g/mol.

Generally speaking, the greater the amount of emulsifier present and the greater the amount of product from the first stage present, the smaller the particles of the product obtained from the last stage.

The polymer dispersions can be prepared in a conventional manner, in accordance with the emulsion polymerization processes that are common knowledge, from the monomers, using the customary emulsifying and dispersing assistants and polymerization initiators.

Dispersants contemplated for implementing free-radically aqueous emulsion polymerizations include typically employed emulsifiers in amounts of 0% to 3.5% by weight, preferably of 0% to 3% by weight, more preferably of 0.1% to 2%, very preferably of 0.1% to 1.5%, and more particularly 0.1% to 1% by weight, based on the total amount of the free-radically polymerizable monomers metered into the free-radical polymerization in all the stages. Preferably, at least one emulsifier is present.

Emulsifiers for the purposes of the present specification are those compounds which are capable of stabilizing a dispersion of an organic phase and an aqueous phase by reducing the interfacial tension between these phases.

Further customary emulsifiers are, for example, ammonium salts or alkali metal salts of $C_8$ to $C_{20}$ alkylsulfonates, sulfates, phosphonates, phosphates, and carboxylates, such as, for example, higher fatty alcohol sulfates such as Na n-lauryl sulfate, or of $C_8$ to $C_{20}$ alkylbenzenesulfonates, sulfates, phosphonates, phosphates, and carboxylates, and alkoxylated, preferably ethoxylated, $C_8$ to $C_{12}$ alkylphenols having a degree of ethoxylation of 3 to 30, and also alkoxylated, preferably ethoxylated, $C_8$ to $C_{25}$ fatty alcohols having a degree of ethoxylation of 5 to 50. These alkoxylated alcohols may also be in esterified form, as the sulfate, sulfonate, phosphate, polyphosphate or phosphonate, with ammonium ions or alkali metal ions as counterions.

Further suitable emulsifiers are listed in Houben-Weyl, Methoden der organischen Chemie, Volume XIV, Makromolekulare Stoffe [Macromolecular compounds], Georg Thieme Verlag, Stuttgart, 1961, pages 192 to 209.

With advantage, the emulsifiers used in accordance with the invention are ionic emulsifiers, more particularly anionic emulsifiers, or combinations thereof.

In one preferred embodiment the emulsifiers used are those which are incorporated into the polymer in the course of the free-radical polymerization. These are, generally, compounds which carry at least one free-radically polymerizable group, preferably selected from the group consisting of allyl, acrylate, methacrylate, and vinyl ether, and at least one emulsifying group, preferably selected from the group indicated above.

Examples of incorporable emulsifiers of this kind are those of the brand names Bisomer® MPEG 350 MA from Laporte, Hitenol® BC-20 (APEO), Hitenol® BC-2020, Hitenol® KH-10 or Noigen® RN-50 (APEO) from Dai-Ichi Kogyo Seiyaku Co., Ltd., Maxemul® 6106, Maxemul® 6112, Maxemul® 5010, Maxemul® 5011 from Croda, Sipomer® PAM 100, Sipomer® PAM 200, Sipomer® PAM 300, Sipomer® PAM 4000, Sipomer® PAM 5000 from Rhodia, Adeka® Reasoap® PP-70, Adeka® Reasoap® NE-10, Adeka® Reasoap® NE-20, Adeka® Reasoap® NE-30, Adeka® Reasoap® NE-40, Adeka® Reasoap® SE-10N, Adeka® Reasoap® SE-1025A, Adeka® Reasoap® SR-10, Adeka® Reasoap® SR-1025, Adeka® Reasoap® SR-20, Adeka® Reasoap® ER-10, Adeka® Reasoap® ER-20, Adeka® Reasoap® ER-30, Adeka® Reasoap® ER-40 from Adeka, Pluriol® A 010 R, Pluriol® A 12 R, Pluriol® A 23 R, Pluriol® A 46 R, Pluriol® A 750 R, Pluriol® A 950 R, Pluriol® A 590 I, Pluriol® A 1190 I, Pluriol® A 590 V, Pluriol® A 1190 V, Pluriol® A 5890 V, Pluriol® A 308 R, and DAA ES 8761 from BASF, Latemul® S 180 A and Latemul®S 180 from Kao, Eleminol® JS-2 from Sanyou Kasei, Aquaron® HS-1025 from Daiichi Kogyou Seiyaku, and C12-AMPS from Lubrizol.

Polymerization initiators contemplated include all those capable of triggering a free-radical emulsion polymerization in aqueous media. They are used generally in amounts of 0.1% to 10% by weight, preferably of 0.2% to 4% by weight, based on the monomers. Customary compounds are inorganic peroxides, examples being sodium and ammonium peroxodisulfate and hydrogen peroxide, organic peroxides such as dibenzoyl peroxide or tert-butyl hydroperoxide, and azo compounds such as azoisobutyrodinitrile. These initiators are suitable for the reaction temperatures of 50 to 100° C. that are customary for free-radical emulsion polymerizations. If lower reaction temperatures are desired, of 40 to 60° C., for instance, redox systems are preferred, such as combinations of peroxy compounds and a reducing coinitiator the sodium salt of hydroxymethanesulfinic acid, ascorbic acid or iron(II) salts.

The preparation of aqueous polymer dispersions by the process of free-radical emulsion polymerization is known per se (cf. Houben-Weyl, Methoden der organischen Chemie, Volume XIV, Makromolekulare Stoffe, loc. cit., pages 133ff).

A feed process has proven particularly appropriate, which starts from an initial charge consisting of a portion of the monomers, generally up to 20% by weight, water, emulsifier, and initiator. The remainder of the monomers and any regulators, in emulsified form, and also, in addition, an aqueous solution of further polymerization initiator, are added in line with the polymerization.

The monomers here may be divided between two or more feed streams, and may be provided with a variable metering rate and/or with a variable amount of one or more monomers.

In one possible embodiment, different degrees of crosslinking of the inner and outer regions may be produced, by leaving the concentration of monomers and crosslinkers in the reaction mixture largely constant, but varying the amount of regulator (chain transfer agent).

Through the presence of regulators in a polymerization, chain termination and the start of a new chain have the effect in general, through the new free radical thus produced, of lowering the molecular weight of the resultant polymer and, where crosslinkers are present, also lowering the number of crosslinking sites (crosslinking density). If the concentration of regulator is increased in the course of a polymerization, then the crosslinking density is further reduced in the course of the polymerization.

Molecular weight regulators of this kind are known, and may, for example, be mercapto compounds, such as, preferably, tertiary dodecyl mercaptan, n-dodecyl mercaptan, isooctylmercaptopropionic acid, mercaptopropionic acid, dimeric α-methylstyrene, 2-ethylhexyl thioglycolate (EHTG), 3-mercaptopropyltrimethoxysilane (MTMO) or terpinolene. The molecular weight regulators are known and are described in, for example, Houben-Weyl, Methoden der organischen Chemie, Volume XIV/1, p. 297 ff., 1961, Stuttgart.

In one preferred embodiment of the present invention, the polymerization may be carried out as described in EP 853 636 or in U.S. Pat. No. 3,804,881. The disclosure content of these two documents is hereby expressly incorporated by reference.

The aqueous polymer dispersions thus obtained preferably have a solids content of 35% to 65%, more preferably of 38% to 55%, by weight.

The polymer dispersions feature high stability, with virtually no coagulum formed. For a given hydroxyl number, given solids content, and given molecular weight, the polymer dispersions of the invention have a lower viscosity than comparable polymer dispersions not obtained in accordance with the invention.

The glass transition temperature, $T_g$, is preferably determined in this specification in accordance with ISO 11357-2-3-7, by way of differential scanning calorimetry (DSC), preferably with a heating rate of 20° C./min.

In one preferred embodiment, the copolymer obtained from the first stage has a glass transition temperature of 40 to 150° C., preferably 50 to 120° C., more preferably 50 to 100° C., and the product obtained from the last stage has a glass transition temperature which is lower by at least 40° C. Polymer dispersions of this kind can be used with advantage in coating compositions for the coating of substrates.

The minimum film-forming temperature (MFFT) of polymer dispersions of this kind that are used for coating compositions is advantageously not more than 5° C. In spite of this, the resulting films are not tacky.

The minimum film-forming temperature is determined by drawing down the dispersion onto a plate which is heated at one end and cooled at the other (DIN ISO 2115:2001-04). By means of visual assessment and temperature sensors at close intervals along the plate, the minimum film-forming temperature can be ascertained.

The polymer dispersions can be used as binders for one-component or two-component coating compositions, such as for varnishes, protective coverings, traffic markings, decorative coverings, paints, and coatings.

For the different utilities it is possible to add suitable auxiliaries, examples being flow control agents, thickeners, defoamers, fillers, pigments, pigment dispersing assistants, etc.

The coatings may be obtained by applying the coating compositions to suitable substrates, such as wood, concrete, metal, glass, plastic, ceramics, plasters, stone, asphalt, textiles, or coated, primed or weathered substrates.

In the case of two-component coating compositions, a necessary further component is a crosslinker, which comprises, for example, the polyisocyanates known for these purposes to a skilled person.

The monomeric isocyanates used for preparing the polyisocyanates may be aromatic, aliphatic or cycloaliphatic, preferably aliphatic or cycloaliphatic, referred to for short in this specification as (cyclo)aliphatic; aliphatic isocyanates are particularly preferred.

Aromatic isocyanates are those which comprise at least one aromatic ring system, in other words not only purely aromatic compounds but also araliphatic compounds. The former are isocyanates where the isocyanato groups are attached directly to aromatic ring systems, whereas in the latter the isocyanato groups are attached to alkylene groups, but the compounds also comprise aromatic ring systems, as in the case of TMXDI, for example.

Cycloaliphatic isocyanates are those which comprise at least one cycloaliphatic ring system.

Aliphatic isocyanates are those which comprise exclusively linear or branched chains, i.e., acyclic compounds.

The monomeric isocyanates are preferably diisocyanates, which carry precisely two isocyanate groups. They can, however, in principle also be monoisocyanates, having one isocyanate group.

In principle, higher isocyanates having on average more than 2 isocyanate groups are also contemplated. Suitability therefor is possessed for example by triisocyanates such as triisocyanatononane, 2'-isocyanatoethyl 2,6-diisocyanatohexanoate, 2,4,6-triisocyanatotoluene, triphenylmethane triisocyanate or 2,4,4'-triisocyanatodiphenyl ether, or the mixtures of diisocyanates, triisocyanates, and higher polyisocyanates that are obtained, for example, by phosgenation of corresponding aniline/formaldehyde condensates and represent methylene-bridged polyphenyl polyisocyanates.

These monomeric isocyanates do not contain any substantial products of reaction of the isocyanate groups with themselves.

The monomeric isocyanates are preferably isocyanates having 4 to 20 C atoms. Examples of typical diisocyanates are aliphatic diisocyanates such as tetramethylene diisocyanate, pentamethylene 1,5-diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate (e.g., methyl 2,6-diisocyanatohexanoate or ethyl 2,6-diisocyanatohexanoate), trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4-, or 2,6-diisocyanato-1-methylcyclohexane, and also 3 (or 4), 8 (or 9)-bis(isocyanatomethyl)tricyclo[5.2.1.0$^{2,6}$]decane isomer mixtures, and also aromatic diisocyanates such as tolylene 2,4- or 2,6-diisocyanate and the isomer mixtures thereof, m- or p-xylylene diisocyanate, 2,4'- or 4,4'-diisocyanatodiphenylmethane and the isomer mixtures thereof, phenylene 1,3- or 1,4-diisocyanate, 1-chlorophenylene 2,4-diisocyanate, naphthylene 1,5-diisocyanate, diphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene or diphenyl ether 4,4'-diisocyanate.

Particular preference is given to hexamethylene 1,6-diisocyanate, 1,3-bis(isocyanatomethyl)cyclohexane, isophorone diisocyanate, and 4,4'- or 2,4'-di(isocyanatocyclohexyl) methane, very particular preference to isophorone diisocyanate and hexamethylene 1,6-diisocyanate, and especial preference to hexamethylene 1,6-diisocyanate.

Mixtures of said isocyanates may also be present.

Isophorone diisocyanate is usually in the form of a mixture, specifically a mixture of the cis and trans isomers, generally in a proportion of about 60:40 to 90:10 (w/w), preferably of 70:30 to 90:10.

Dicyclohexylmethane 4,4'-diisocyanate may likewise be in the form of a mixture of the different cis and trans isomers.

For the polyisocyanate it is possible to use not only those diisocyanates obtained by phosgenating the corresponding amines but also those prepared without the use of phosgene, i.e., by phosgene-free processes. According to EP-A-0 126 299 (U.S. Pat. No. 4,596,678), EP-A-126 300 (U.S. Pat. No. 4,596,679), and EP-A-355 443 (U.S. Pat. No. 5,087,739), for example, (cyclo)aliphatic diisocyanates, such as hexamethylene 1,6-diisocyanate (HDI), isomeric aliphatic diisocyanates having 6 carbon atoms in the alkylene radical, 4,4'- or 2,4'-di(isocyanatocyclohexyl)methane, and 1-isocyanato-3-isocyanatomethyl-3,5,5-trimethylcyclohexane (isophorone diisocyanate or IPDI) can be prepared by reacting the (cyclo) aliphatic diamines with, for example, urea and alcohols to give (cyclo)aliphatic biscarbamic esters and subjecting said esters to thermal cleavage into the corresponding diisocyanates and alcohols. The synthesis takes place usually continuously in a circulation process and optionally in the presence of N-unsubstituted carbamic esters, dialkyl carbonates, and other by-products recycled from the reaction process. Diisocyanates obtained in this way generally contain a very low or even unmeasurable fraction of chlorinated compounds, which is advantageous, for example, in applications in the electronics industry.

In one embodiment of the present invention the isocyanates used have a total hydrolyzable chlorine content of less than 200 ppm, preferably of less than 120 ppm, more preferably less than 80 ppm, very preferably less than 50 ppm, in particular less than 15 ppm, and especially less than 10 ppm. This can be measured by means, for example, of ASTM specification D4663-98. Of course, though, monomeric isocyanates having a higher chlorine content can also be used, of up to 500 ppm, for example.

It will be appreciated that it is also possible to employ mixtures of those monomeric isocyanates which have been obtained by reacting the (cyclo)aliphatic diamines with, for example, urea and alcohols and cleaving the resulting (cyclo) aliphatic biscarbamic esters, with those diisocyanates which have been obtained by phosgenating the corresponding amines.

The polyisocyanates which can be formed by oligomerizing the monomeric isocyanates are generally characterized as follows:

The average NCO functionality of such compounds is in general at least 1.8 and can be up to 8, preferably 2 to 5, and more preferably 2.4 to 4.

The isocyanate group content after oligomerization, calculated as NCO=42 g/mol, is generally from 5% to 25% by weight unless otherwise specified.

The polyisocyanates are preferably compounds as follows:

1) Polyisocyanates containing isocyanurate groups and derived from aromatic, aliphatic and/or cycloaliphatic diisocyanates. Particular preference is given in this context to the corresponding aliphatic and/or cycloaliphatic isocyanatoisocyanurates and in particular to those based on hexamethylene diisocyanate and isophorone diisocyanate. The isocyanurates present are, in particular, trisisocyanatoalkyl and/or trisisocyanatocycloalkyl isocyanurates, which constitute cyclic trimers of the diisocyanates, or are mixtures with their higher homologs containing more than one isocyanurate ring. The isocyanatoisocyanurates generally have an NCO content of 10% to 30% by weight, in particular 15% to 25% by weight, and an average NCO functionality of 2.6 to 8.

The polyisocyanates containing isocyanurate groups may to a minor extent also comprise urethane groups and/or allophanate groups, preferably with a bound-alcohol content of less than 2%, based on the polyisocyanate.

2) Polyisocyanates containing uretdione groups and having aromatically, aliphatically and/or cycloaliphatically attached isocyanate groups, preferably aliphatically and/or cycloaliphatically attached, and in particular those derived from hexamethylene diisocyanate or isophorone diisocyanate. Uretdione diisocyanates are cyclic dimerization products of diisocyanates.

The polyisocyanates containing uretdione groups are obtained frequently in a mixture with other polyisocyanates, more particularly those specified under 1). Polyisocyanates containing uretdione groups typically have functionalities of 2 to 3.

For this purpose the diisocyanates can be reacted under reaction conditions under which not only uretdione groups but also the other polyisocyanates are formed, or the uretdione groups are formed first of all and are subsequently reacted to give the other polyisocyanates, or the diisocyanates are first reacted to give the other polyisocyanates, which are subsequently reacted to give products containing uretdione groups.

3) Polyisocyanates containing biuret groups and having aromatically, cycloaliphatically or aliphatically attached, preferably cycloaliphatically or aliphatically attached, isocyanate groups, especially tris(6-isocyanatohexyl)biuret or its mixtures with its higher homologs. These polyisocyanates containing biuret groups generally have an NCO content of 18% to 24% by weight and an average NCO functionality of 2.8 to 6.

4) Polyisocyanates containing urethane and/or allophanate groups and having aromatically, aliphatically or cycloaliphatically attached, preferably aliphatically or cycloaliphatically attached, isocyanate groups, of the kind, for example, by reaction of excess amounts of diisocyanate, such as of hexamethylene diisocyanate or of isophorone diisocyanate, with mono- or polyhydric alcohols. These polyisocyanates containing urethane and/or allophanate groups generally have an NCO content of 12% to 24% by weight and an average NCO functionality of 2.0 to 4.5. Polyisocyanates of this kind containing urethane and/or allophanate groups may be prepared without catalyst or, preferably, in the presence of catalysts, such as ammonium carboxylates or ammonium hydroxides, for example, or allophanatization catalysts, such as bismuth, cobalt, cesium, Zn(II) or Zr(IV) compounds, for example, in each case in the presence of monohydric, dihydric or polyhydric, preferably monohydric, alcohols.

These polyisocyanates containing urethane groups and/or allophanate groups occur frequently in hybrid forms with the polyisocyanates specified under 1).

5) Polyisocyanates comprising oxadiazinetrione groups, derived preferably from hexamethylene diisocyanate or isophorone diisocyanate. Polyisocyanates of this kind comprising oxadiazinetrione groups are accessible from diisocyanate and carbon dioxide.

6) Polyisocyanates comprising iminooxadiazinedione groups, derived preferably from hexamethylene diisocyanate or isophorone diisocyanate. Polyisocyanates of this kind comprising iminooxadiazinedione groups are preparable from diisocyanates by means of specific catalysts.

7) Uretonimine-modified polyisocyanates.

8) Carbodiimide-modified polyisocyanates.

9) Hyperbranched polyisocyanates, of the kind known for example from DE-A1 10013186 or DE-A1 10013187.

10) Polyurethane-polyisocyanate prepolymers, from di- and/or polyisocyanates with alcohols.

11) Polyurea-polyisocyanate prepolymers.

12) The polyisocyanates 1)-11), preferably 1), 3), 4), and 6), can be converted, following their preparation, into polyisocyanates containing biuret groups or urethane/allophanate groups and having aromatically, cycloaliphatically or aliphatically attached, preferably (cyclo)aliphatically attached, isocyanate groups. The formation of biuret groups, for example, is accomplished by addition of water or by reaction with amines. The formation of urethane and/or allophanate groups is accomplished by reaction with monohydric, dihydric or polyhydric, preferably monohydric, alcohols, in the presence optionally of suitable catalysts. These polyisocyanates containing biuret or urethane/allophanate groups generally have an NCO content of 10% to 25% by weight and an average NCO functionality of 3 to 8.

13) Hydrophilically modified polyisocyanates, i.e., polyisocyanates which as well as the groups described under 1-12 also comprise groups which result formally from addition of molecules containing NCO-reactive groups and hydrophilizing groups to the isocyanate groups of the above molecules. The latter groups are nonionic groups such as alkylpolyethylene oxide and/or ionic groups derived from phosphoric acid, phosphonic acid, sulfuric acid or sulfonic acid, and/or their salts.

14) Modified polyisocyanates for dual cure applications, i.e., polyisocyanates which as well as the groups described under 1-13 also comprise groups resulting formally from addition of molecules containing NCO-reactive groups and UV-crosslinkable or actinic-radiation-crosslinkable groups to the isocyanate groups of the above molecules. These molecules are, for example, hydroxyalkyl(meth)acrylates and other hydroxy-vinyl compounds.

In one preferred embodiment of the present invention the polyisocyanates are hydrophilically modified polyisocyanates.

In one particularly preferred embodiment the polyisocyanate encompasses polyisocyanates based on 1,6-hexamethylene diisocyanate.

In one further particularly preferred embodiment the polyisocyanate encompasses a mixture of polyisocyanates, very preferably of 1,6-hexamethylene diisocyanate and of isophorone diisocyanate.

In one particularly preferred embodiment the polyisocyanate is a mixture comprising low-viscosity polyisocyanates, preferably polyisocyanates comprising isocyanurate groups, having a viscosity of 600-1500 mPa*s, more particularly below 1200 mPa*s, low-viscosity urethanes and/or allophanates having a viscosity of 200-1600 mPa*s, more particularly 600-1500 mPa*s, and/or polyisocyanates comprising iminooxadiazinedione groups.

In this specification, unless noted otherwise, the viscosity is reported at 23° C. in accordance with DIN EN ISO 3219/A.3 in a cone/plate system with a shear rate of $1000\ s^{-1}$.

The process for preparing the polyisocyanates may take place as described in WO 2008/68198, especially from page 20 line 21 to page 27 line 15 therein, which is hereby made part of the present specification by reference.

The reaction can be discontinued, for example, as described therein from page 31 line 19 to page 31 line 31, and working up may take place as described therein from page 31 line 33 to page 32 line 40, which in each case is hereby made part of the present specification by reference.

The reaction can alternatively be discontinued as described in WO 2005/087828 from page 11 line 12 to page 12 line 5, which is hereby made part of the present specification by reference.

In the case of thermally labile catalysts it is also possible, furthermore, to discontinue the reaction by heating the reaction mixture to a temperature above at least 80° C., preferably at least 100° C., more preferably at least 120° C. Generally it is sufficient for this purpose to heat the reaction mixture, in the way which is necessary at the working-up stage in order to separate the unreacted isocyanate by distillation.

In the case both of thermally non-labile catalysts and of thermally labile catalysts, the possibility exists of terminating the reaction at relatively low temperatures by addition of deactivators. Examples of suitable deactivators are hydrogen chloride, phosphoric acid, organic phosphates, such as dibutyl phosphate or diethylhexyl phosphate, carbamates such as hydroxyalkyl carbamate, or organic carboxylic acids.

These compounds are added neat or diluted in a suitable concentration as necessary to discontinue the reaction.

As a second component in two-component coating compositions, it is also possible to use melamine-formaldehyde and urea-formaldehyde resins.

Melamine-formaldehyde resins can be characterized according to fields of application (molding compounds, glues, impregnating resins, coating materials), alkylating compounds (etherification with butanol, methanol, mixed etherification) or, as listed here, according to the ratio of triazine to formaldehyde to etherifying alcohol:

1. completely to highly methylolated and fully alkylated to highly alkylated resins (HMMM grades)

2.1 partly methylolated and highly alkylated resins (high imino grades)

2.2. partly methylolated and partly alkylated resins (methylol grades)

3. resins with a low degree of methylolation (melamine-formaldehyde condensates)

The first major group, that of the fully etherified melamine-formaldehyde resins, in which the so-called molar melamine:formaldehyde:alcohol incorporation ratio is theoretically 1:6:

6, in practice generally 1:>5.5:>5.0, and usually 1:>5.5:>4.5, is distinguished by extremely good high-solids behavior (relatively low viscosity at high solids content). In this group of crosslinkers, the free formaldehyde is readily reducible, owing to the low viscosity of the amino resin. At the present time it is possible to achieve a free formaldehyde content of <0.3% by weight. The commercial products usually comprise methanol as the alcohol, although grades with mixed etherification, or fully butylated grades, are also known.

The fully etherified melamine-formaldehyde resins are employed in practice preferably in can coatings and coil coatings worldwide, and in NAFTA also for all coats of the automotive coat system.

The low thermal reactivity under baking conditions, such as 20 minutes at 140° C., necessitates catalysis with strong acids for these fully etherified melamine-formaldehyde resins. This results in very rapid curing, and a homogeneous co-network as a result of transetherification with the binder, accompanied by the release of the etherifying alcohols. With this strong-acid catalysis, very short cure times are possible, as with partly methylolated melamine-formaldehyde resins. Crosslinking may be accompanied by formaldehyde emission which goes well beyond the free formaldehyde and is due to the re-splitting of methylol groups.

The second major group, that of the partly etherified melamine-formaldehyde resins, which in practice usually have a molar melamine:formaldehyde:alcohol incorporation ratio of 1:3 to 5.4:2 to 4.3, is distinguished by a much higher thermal reactivity than that of the first group, without acid catalysis. The production of these crosslinkers is accompanied by self-condensation, which leads to a higher viscosity (lower high-solids behavior) and so makes it more difficult to remove the free formaldehyde at distillation. For these products, a free formaldehyde content of 0.5% to 1.5% is standard, although there are also products having a free formaldehyde content of 0.3% to 3% by weight. Here again, methylated and butylated grades and also grades with mixed etherification are widely encountered as commercial products. Etherification with further alkylating substances is described in the literature and available in the form of specialty products.

High-imino grades and methylol grades, each as a subgroup, both feature incomplete methylolation, i.e., molar formaldehyde incorporation ratios of less than 1:5.5. The high-imino grades differ from the methylol grades, however, in a high degree of alkylation, i.e., the fraction of etherified methylol groups as a proportion of the formaldehyde equivalents incorporated, of usually up to 80%, whereas the figure for the methylol grades is generally <70%.

Applications for the partly methylolated melamine-formaldehyde resins extend across all fields of use, including combinations with HMMM grades, for adaptation of reactivity, where curing temperatures of 100 to 150° C. are called for. Additional catalysis using weak acids is possible and is common practice.

Besides the reaction of the amino resin with the binder, there is a substantially increased proportion of self-crosslinking on the part of the crosslinker. The consequence is a reduced elasticity in the system as a whole, and this must be compensated by appropriate selection of the co-component. Set against this is the advantage of reduced total formaldehyde emission from the coatings produced from the system.

As well as amino resins—especially melamine-formaldehyde resins—with only one etherifying alcohol, products with mixed etherification are increasingly gaining in importance.

Another group of amino resins, whose construction and properties are very similar to those of the melamine-formaldehyde resins, are the benzoguanamine resins (benzoguanamine/formaldehyde resins). Free OH groups may also be at least partly etherified with lower alcohols, especially $C_1$-$C_4$ alcohols, more preferably methanol or n-butanol.

Other amino resins include, for example, urea resins, in other words polycondensation products of urea and formaldehyde (abbreviated code UF, according to DIN EN ISO 1043-1: 2002-6). Free OH groups may also be at least partly etherified with lower alcohols, especially $C_1$-$C_4$ alcohols, more preferably methanol or n-butanol.

The amino resins may preferably be melamine-formaldehyde resins, benzoguanamine/formaldehyde resins, and urea/formaldehyde resins, each of which may optionally be at least partly etherified, and which preferably are at least partly etherified.

The resins more preferably are at least partly etherified melamine-formaldehyde resins or benzoguanamine/formaldehyde resins, and very preferably are at least partly etherified melamine-formaldehyde resins.

The structure of melamine-formaldehyde resins which can be employed as amino resins in accordance with the invention is, for example, as follows:

As mentioned earlier, melamine-formaldehyde resins are frequently characterized by way of the molar melamine:formaldehyde:alcohol incorporation ratio. The alcohol here is preferably selected from the group consisting of methanol, ethanol, isobutanol and n-butanol or mixtures thereof, and more preferably selected from the group consisting of methanol and n-butanol.

Melamine-formaldehyde resins which can be used in accordance with the invention may have a molar incorporation ratio of 1:2 to 6:1 to 6, though in individual cases, as a result of the formation of oligoformal chains, the formaldehyde incorporation ratio may even be up to 8.

Preferred molar incorporation ratios are 1:3 to 6:1.5 to 6.

For methyl-etherified melamine-formaldehyde resins, molar incorporation ratios of 1:3.6 to 5.7:2.1 to 4.7 are particularly preferred; very much preferred are molar incorporation ratios of 1:5 to 6:3.5 to 6, more particularly 1:5 to 6:4.0 to 5.0.

For n-butyl-etherified melamine-formaldehyde resins, molar incorporation ratios of 1:3.2 to 5.7:1.3 to 4 are particularly preferred; very much preferred are molar incorporation ratios of 1:5 to 6:3.5 to 6, more particularly 1:5 to 6:3.5 to 4.5.

The melamine-formaldehyde resins that can be used may have not only one melamine group per polycondensate but, indeed, two or more melamine groups, preferably up to six, more preferably up to four, very preferably up to three, and more particularly up to two.

The structure of benzoguanamine/formaldehyde resins which can be used as amino resins in accordance with the invention is, for example, as follows:

benzoguanamine-formaldehyde resins as well are frequently characterized by way of the molar benzoguanamine:formaldehyde:alcohol incorporation ratio. The alcohol in this case is preferably selected from the group consisting of methanol, ethanol, isobutanol and n-butanol or mixtures thereof, more preferably selected from the group consisting of methanol and n-butanol.

Benzoguanamine-formaldehyde resins which can be used in accordance with the invention may have a molar incorporation ratio of 1:1.5 to 4:1 to 4, though in certain cases, as a result of formation of oligoformal chains, the formaldehyde incorporation ratio may even be up to 6.

Preference is given to molar incorporation ratios of 1:2 to 4:1.5 to 4.

For methyl-etherified benzoguanamine-formaldehyde resins, molar incorporation ratios of 1:2.2 to 3.7:2.1 to 3.0 are particularly preferred; very particular preference is given to molar incorporation ratios of 1:3 to 4:1.5 to 4, more particularly 1:3 to 4:2.0 to 3.0.

For n-butyl-etherified benzoguanamine-formaldehyde resins, molar incorporation ratios of 1:2.2 to 3.7:1.3 to 2 are particularly preferred; very particular preference is given to molar incorporation ratios of 1:3 to 4:1.5 to 4, more particularly 1:3 to 4:1.5 to 2.5.

The benzoguanamine-formaldehyde resins which can be used may have not only one benzoguanamine group per polycondensate but also, indeed, two or more benzoguanamine groups, preferably up to five, more preferably up to four, very preferably up to three, and more particularly up to two.

The structure of urea/formaldehyde resins which can be used as amino resins in accordance with the invention is, for example, as follows:

urea-formaldehyde resins which can be used in accordance with the invention may have a molar urea/formaldehyde/alcohol incorporation ratio of 1:1-4:0.3-3, preferably 1:1-3:0.4-2, more preferably 1:1.5-2.5:0.5-1.5, very preferably 1:1.6-2.1:0.6-1.3.

The alcohol here is preferably selected from the group consisting of methanol, ethanol, isobutanol and n-butanol or mixtures thereof, and more preferably selected from the group consisting of methanol and n-butanol.

The urea/formaldehyde resins also include what are called glycoluril resins, which form through the reaction of glycoluril—the reaction product of glyoxal with two equivalents of urea—with formaldehyde, and are optionally etherified with one or more alcohols.

Application to the substrate may take place in a known way, as for example by spraying, knifing, knifecoating, brushing, rolling, roller coating or pouring. The coating thickness is situated generally in a range from about 3 to 1000 g/m$^2$ and preferably 10 to 200 g/m$^2$. The volatile constituents of the dispersions are removed subsequently. This operation may be repeated one or more times if desired.

In order to remove the water present in the dispersion, application to the substrate is followed by drying, in a tunnel oven or by flashing, for example. Drying may also take place by means of NIR radiation, with NIR radiation referring here to electromagnetic radiation in the wavelength range from 760 nm to 2.5 µm, preferably from 900 to 1500 nm. Drying may take place at a temperature from ambient temperature to 100° C. over a period of a few minutes up to several days.

The polymer dispersion of the invention is, in one particular embodiment, especially suitable as a binder for varnishes and as a binder for paints.

In an anticorrosion coating utility, the polymer dispersion may be accompanied by anticorrosion agents, such as corrosion inhibitors or active anticorrosion pigments.

Examples of corrosion inhibitors are set out in "Corrosion Inhibitors, 2nd Edition. An Industrial Guide", Ernest W. Flick, Ed: William Andrew Inc ISBN: 978-0-8155-1330-8. Preferred corrosion inhibitors are hexamine, benzotriazole, phenylenediamine, dimethylethanolamine, polyaniline, sodium nitrite, cinnamaldehyde, condensation products of aldehydes and amines (imines), chromates, nitrites, phosphates, hydrazine, and ascorbic acid.

Examples of anticorrosion pigments are modified zinc orthophosphates (for example, HEUCOPHOS® ZPA, ZPO, and ZMP), polyphosphates (for example HEUCOPHOS® ZAPP, SAPP, SRPP, and CAPP), WSA—Wide Spectrum Anticorrosives (for example HEUCOPHOS® ZAMPLUS and ZCPPLUS) and modified silicate pigments (for example HEUCOSIL® CTF, Halox® 750), from Heubach GmbH, for example, and also barium borophosphate (for example Halox® 400), barium phosphosilicates (for example Halox® BW-111, Halox® BW-191), calcium borosilicates (for example Halox® CW-291, CW-22/221, CW-2230), calcium phosphosilicate (for example Halox® CW-491), strontium phosphosilicate (for example Halox® SW-111) or strontium zinc phosphosilicate (for example, Halox® SZP-391), from Halox®.

The nature of the metal may in principle relate to any desired metals. More particularly, however, the metal encompasses those metals or alloys which are typically used as metallic construction materials and which require protection from corrosion.

For corrosion control, the polymer dispersions are used to treat, as substrates, the surfaces of iron, steel, Zn, Zn alloys, Al or Al alloys. The surfaces may be uncoated, may be coated with zinc, aluminum or alloys thereof, may be hot dip galvanized, electroplated with zinc, sherardized, or precoated with primers.

The surfaces in question are, in particular, those of iron, steel, zinc, zinc alloys, aluminum or aluminum alloys. Steel may comprise the typical alloying components known to the skilled worker. The surfaces in question may be surfaces of structures composed entirely of the stated metals or alloys. Alternatively they may be the surfaces of structures coated with Zn, Zn alloys, Al or Al alloys, the structures themselves being composed of other materials, for example of other metals, alloys, polymers or composites. In one preferred embodiment of the invention the surfaces are those of untreated steel or of galvanized and/or aluminized steel.

Zinc alloys or aluminum alloys are known to the skilled worker. Typical constituents of zinc alloys comprise, in particular, Al, Pb, Si, Mg, Sn, Cu or Cd. Typical constituents of aluminum alloys comprise, in particular, Mg, Mn, Si, Zn, Cr, Zr, Cu or Ti. The term "zinc alloy" is also intended to include Al/Zn alloys in which Al and Zn are present in approximately equal quantity. The skilled worker selects the identity and amount of alloying constituents in accordance with the desired end application. Zn or aluminum coatings can be applied to steel by means for example of hot dip methods, such as hot dip galvanizing, or by means of sherardizing. Where the component is stationary or the geometry of the component does not permit otherwise, corresponding coats can also be applied by means of thermal spraying (spray galvanizing, spray aluminizing).

The polymer dispersions of the invention can be used to provide protection against corrosion to any metallic surfaces, in particular those which in the course of service are in contact with atmospheric air, although the surfaces in question may also be those which in the course of service are in contact with water, soil or other corrosive media.

The metallic surfaces to be protected against corrosion by means of the polymer dispersions and coating compositions of the invention may in principle be any desired surfaces. Preferably, though, they are the surfaces of metallic structures or metal constructions and/or their required components. Metal constructions and structures are typically joined from construction-grade steel, such as steel girders, steel pipes or steel panels, by riveting, welding or screwing, to form corresponding constructions. In one embodiment of the invention the coated articles may be stationary metallic constructions such as, for example, buildings, bridges, power masts, tanks, containers, buildings, pipelines, power plants, chemical plants, ships, cranes, posts, bulkheads, valves, pipes, tanks, fittings, flanges, couplings, halls, roofs, and construction-grade steel. In the case of this embodiment, corrosion control coatings are typically applied by spreading or spraying on site. This corrosion control may be either first-time control or a renovation. The drying and curing of such corrosion control coatings takes place under atmospheric conditions, in other words at ambient temperature, and in the presence of air and typical atmospheric humidity. The relative atmospheric humidity may have any desired value, but is preferably between 10% and 80% and more preferably between 30% and 70%. Depending on the degree of protection required, the protection of surfaces against corrosion by means of corrosion control paints is also referred to as light, medium, and heavy duty corrosion control.

As far as is possible, however, it is preferred to bake the coating compositions of the invention at an elevated temperature in order thus to obtain corrosion control coatings.

The polymer dispersions and coating compositions of the invention can be used as or in preparations for the treatment of metallic surfaces.

In light, medium or heavy duty corrosion control this can be accomplished by means, for example, of spray application or spread application, the paint being subsequently cured under atmospheric conditions. It is of course also possible to apply two or more paints or coatings, identical or different in composition, in succession. The overall thickness (dry) of corrosion control paints of this kind is determined by the skilled worker in accordance with the desired properties of the corrosion control coat. It amounts, for example, to at least 25 µm, in general to at least 40 µm, preferably at least 50 µm, more preferably at least 60 µm, and very preferably at least 80 µm, in particular at least 100 µm, especially at least 125 µm, often at least 150 µm, and even at least 175 µm or at least 200 µm. The upper limit for the overall coat thickness, i.e., the thickness of all applied corrosion control coats together, is 2 mm, preferably less than 1.5 mm, more preferably less than 1 mm, very preferably less than 800 µm, and in particular less than 500 µm.

The coating materials of the invention can be applied in any desired way, as for example by spreading or spraying.

The curing method is guided by the nature of the crosslinker and takes place as a general rule under atmospheric conditions.

The temperature needed for curing is guided in particular by the crosslinker employed. Highly reactive crosslinkers can be cured at lower temperatures than less reactive crosslinkers.

The term "atmospheric corrosion control" means in the context of this invention that the coating which comprises at least one polymer dispersion of the invention has a coat thickness after drying of at least 40 µm, preferably at least 50 µm, more preferably at least 60 µm, and very preferably at least 80 µm, and a coat thickness of up to 2 mm, preferably less than 1.5 mm, more preferably less than 1 mm, very preferably less than 800 µm, and in particular less than 500 µm, the coating composition curing following application to the surface under typical ambient conditions, i.e., for instance, at ambient temperature or at room temperature, in the presence of air and also typical atmospheric humidity, without the use of additional apparatus or installations. Typical cure temperatures, depending on the ambient environment, are more than 0 to 40° C., preferably 5 to 35° C., more preferably 10 to 30° C., and very preferably 15 to 25° C. in the presence of air and typical atmospheric humidity. The relative humidity may be whatever is desired, and is preferably between 10% and 80% and more preferably between 30% and 70%. It is clear to the skilled worker that the time to complete curing of one and the same binder system may differ according to the ambient conditions that are actually prevailing.

In a further embodiment, the polymer dispersions and coating compositions of the invention may be used in clearcoats and in so-called direct-to-metal coatings. The former are distinguished by the absence of any pigments; the latter contain no anticorrosion pigments, are applied to the metal in one coat, and find application more particularly when, in addition to a corrosion control effect, there is a requirement for chemical resistance or gloss. Typical dry film thicknesses are 15 and 200 µm, preferably 20 to 100 µm, and more preferably 20 to 80 µm.

The coating compositions of the invention, more particularly the mixtures of melamine-formaldehyde resins and the polymer dispersions, or of urea-formaldehyde resins and the polymer dispersions, are baked at a temperature between room temperature and 200° C., preferably 100 to 150° C., over a period from 1 minute to 40 minutes, preferably 10 to 25 minutes.

With particular preference the dispersions and preparations of the invention are used in corrosion control compositions which are employed in corrosiveness categories C2 (to DIN EN ISO 12944) or higher, preferably in corrosiveness categories C3 or higher, and more preferably in corrosiveness categories C4 or higher.

The corrosiveness categories in accordance with DIN EN ISO 12944, based on the mass loss per unit area or on the thickness reduction after the first year of exposure storage, are defined as follows for unalloyed steel and for zinc:

| | | |
|---|---|---|
| C2 (low corrosivity): | unalloyed steel: | mass loss > 10-200 g/m$^2$ |
| | | thickness decrease > 1.3-25 µm |
| | zinc: | mass loss > 0.7-5 g/m$^2$ |
| | | thickness decrease > 0.1-0.7 µm |
| C3 (medium corrosivity): | unalloyed steel: | mass loss > 200-400 g/m$^2$ |
| | | thickness decrease > 25-50 µm |
| | zinc: | mass loss > 5-15 g/m$^2$ |
| | | thickness decrease > 0.7-2.1 µm |
| C4 (high corrosivity): | unalloyed steel: | mass loss > 400-650 g/m$^2$ |
| | | thickness decrease > 50-80 µm |
| | zinc: | mass loss > 15-30 g/m2 |
| | | thickness decrease > 2.1-4.2 µm |
| C5-I/M (very high): | unalloyed steel: | mass loss > 650-1500 g/m$^2$ |
| | | thickness decrease > 80-200 µm |
| | zinc: | mass loss > 30-60 g/m$^2$ |
| | | thickness decrease > 4.2-8.4 µm |

Dispersion-based paints, also called emulsion paints, are one of the largest product groups in the paint and coatings industry (see Ullmanns Enzyklopädie der technischen Chemie, 4th edn., Volume 15, Verlag Chemie, Weinheim 1978, p. 665). Emulsion paints generally comprise a film-forming polymer binder and, as a coloring constituent, at least one inorganic pigment, and also inorganic fillers and auxiliaries, such as defoamers, thickeners, wetting agents, and—if desired—film-forming assistants.

Another important property of the polymer dispersions is the high blocking resistance of the paints, by which is meant little sticking of the paint film to itself under pressure load and at elevated temperature (good blocking resistance).

The paints (emulsion paints) of the invention comprise pigments and fillers preferably in amounts such that the pigment volume concentration (PVC) is 10% to 85%, more preferably 10% to 55% and most preferably 10 to 40%. Furthermore, it is possible to use these paints as clearcoats without pigments.

Typical pigments are exemplified by titanium dioxide, preferably in the rutile form, barium sulfate, zinc oxide, zinc sulfide, basic lead carbonate, antimony trioxide, lithopones (zinc sulfide+barium sulfate). However, the emulsion paints may also comprise colored pigments, examples being iron oxides, carbon black, graphite, luminescent pigments, zinc yellow, zinc green, ultramarine, manganese black, antimony black, manganese violet, Paris blue or Schweinfurt green. Besides the inorganic pigments, the emulsion paints of the invention may also comprise organic color pigments, examples being sepia, gamboge, Cassel brown, toluidine red, parared, Hansa yellow, indigo, azo dyes, anthraquinonoid and indigoid dyes, and also dioxazine, quinacridone, phthalocyanine, isoindolinone, and metal-complex pigments.

Suitable fillers include aluminosilicates, such as feldspars, silicates, such as kaolin, talc, mica, magnesite, alkaline earth metal carbonates, such as calcium carbonate, in the form of calcite or chalk, for example, magnesium carbonate, dolomite, alkaline earth metal sulfates, such as calcium sulfate, silicon dioxide, etc. The fillers can be used as individual components. In practice, however, filler mixtures have proven particularly appropriate, e.g., calcium carbonate/kaolin, calcium carbonate/talc.

In order to increase the hiding power and to save on the use of white pigments it is common to use finely divided fillers, examples being finely divided calcium carbonate or mixtures of different calcium carbonates with different particle sizes. For the adjustment of the hiding power of the hue and of the depth of color, it is preferred to employ blends of color pigments and fillers.

Additionally it is easily possible (by freeze or spray drying, for example) to obtain, from the aqueous polymer dispersions of the invention, the corresponding polymer powders.

These inventively accessible polymer powders can likewise be employed as components in the production of adhesives, sealants, synthetic renders, paper-coating slips, fiber webs, painting materials and coating materials for organic substrates, and also for the modification of mineral binders.

The present invention further provides one-component and two-component coating compositions comprising
at least one polymer dispersion of the invention as binder,
optionally at least one other binder,
optionally at least one crosslinker selected from the group consisting of polyisocyanates, melamine-formaldehyde resins, and urea-formaldehyde resins,
optionally at least one pigment,
optionally at least one corrosion inhibitor.

The present invention further provides for the use of such two-component coating compositions for corrosion control, preferably in light, medium or heavy duty corrosion control, more preferably in medium or heavy duty corrosion control.

The polymer dispersions of the invention may be formulated together with a crosslinker as a two-component coating composition. The constitution of these two-component coating compositions may for example be as follows:
20% to 80%, preferably 25% to 70%, and more preferably 30% to 50% by weight of the at least one polymer dispersion of the invention as binder (based on the solids content),
0% to 50%, preferably 5% to 40%, more preferably 10% to 30% by weight of the optional at least one other binder,
20% to 80%, preferably 25% to 70%, and more preferably 30% to 50% by weight of the at least one crosslinker selected from the group consisting of polyisocyanates, melamine-formaldehyde resins, and urea-formaldehyde resins,
0% to 50%, preferably 10% to 40%, more preferably 15% to 30% by weight of the at least one pigment,
0% to 10%, preferably 0.1% to 8%, and more preferably 0.5% to 5% by weight of the optional at least one corrosion inhibitor,
with the proviso that the sum of all of the ingredients is always 100% by weight.

It is also possible, however, to formulate the polymer dispersions without a crosslinker, as a one-component coating composition. In this case the constitution of these one-component coating compositions may be as follows:
20% to 100%, preferably 25% to 90%, and more preferably 30% to 80% by weight of the at least one polymer dispersion of the invention as binder (based on the solids content),
0% to 50%, preferably 5% to 40%, more preferably 10% to 30% by weight of the optional at least one other binder,
0% to 50%, preferably 10% to 40%, more preferably 15% to 30% by weight of the at least one pigment,
0% to 10%, preferably 0.1% to 8%, and more preferably 0.5% to 5% by weight of the optional at least one corrosion inhibitor,
with the proviso that the sum of all of the ingredients is always 100% by weight.

The binders other than the polymer dispersions of the invention may be, for example, water-based, water-dilutable, water-miscible polyacrylate polyols, polyester polyols, polyether polyols, polyurethane polyols; polyurea polyols; polyester polyacrylate polyols; polyester polyurethane polyols; polyurethane polyacrylate polyols, polyurethane-modified alkyd resins; fatty acid modified polyester polyurethane polyols, copolymers with allyl ethers, graft polymers of the stated groups of substances with, for example, different glass transition temperatures, and also mixtures of the stated binders. Preferred are polyacrylate polyols, polyester polyols, and polyurethane polyols.

Preferred OH numbers of these other binders, measured in accordance with DIN 53240-2 (by potentiometry), are 40-350 mg KOH/g resin solids for polyesters, preferably 80-180 mg KOH/g resin solids, and 15-250 mg KOH/g resin solids for polyacrylateols, preferably 80-160 mg KOH/g.

These other binders may additionally have an acid number in accordance with DIN EN ISO 3682 (by potentiometry) of up to 200 mg KOH/g, preferably up to 150 and more preferably up to 100 mg KOH/g.

Particularly preferred other binders are polyacrylate polyols and polyesterols.

Polyacrylate polyols preferably have a molecular weight $M_n$ of at least 500, more preferably at least 1200 g/mol. The molecular weight $M_n$ may in principle have no upper limit, preferably up to 50 000, more preferably up to 20 000 g/mol, very preferably up to 10 000 g/mol, and more particularly up to 5000 g/mol.

Further other binders are, for example, polyester polyols of the kind obtainable by condensing polycarboxylic acids, more particularly dicarboxylic acids, with polyols, more particularly diols. In order to ensure that the polyester polyol has a functionality appropriate for the polymerization use is also made in part of triols, tetrols, etc., and of tribasic acids, etc.

Polyester polyols are known for example from Ullmanns Enzyklopädie der technischen Chemie, 4th edition, volume 19, pages 62 to 65. It is preferred to use polyester polyols obtained by reacting dihydric alcohols with dibasic carboxylic acids. In place of the free polycarboxylic acids it is also possible to use the corresponding polycarboxylic anhydrides or corresponding polycarboxylic esters of lower alcohols or mixtures thereof to prepare the polyester polyols. The polycarboxylic acids may be aliphatic, cycloaliphatic, aromatic or heterocyclic and may optionally be substituted, by halogen atoms, for example, and/or unsaturated.

Optionally the coating compositions may further comprise at least one solvent, which acts preferably as a film-forming assistant. Contemplated for this purpose are, for example, aromatics, such as solvent naphtha, benzene, toluene, xylene, or mixtures of aromatic hydrocarbons, of the kind sold as Solvesso® 100, 150 or 200, for example, chlorobenzene, esters such as ethyl acetate, butyl acetate, methylglycol acetate, ethylglycol acetate, methoxypropyl acetate, 2,2,4-trimethyl-1,3-pentanediol monoisobutyrate (Texanol® from Eastman), dipropylene glycol monomethyl ether acetate, propylene glycol monoethyl ether acetate, propylene glycol monomethyl ether acetate, ethers such as butyl glycol, tetrahydrofuran, dioxane, ethylglycol ether, diethylene glycol monoethyl ether, diethylene glycol monomethyl ether, diethylene glycol mono-n-butyl ether, diethylene glycol mono-n-hexyl ether, diethylene glycol diethyl ether, diethylene glycol dimethyl ether, diethylene glycol di-n-butyl ether, diethylene glycol di-n-hexyl ether, ethylene glycol bis-2-ethylhexyl ether, ethylene glycol di-n-butyl ether, ethylene glycol di-n-hexyl ether, ethylene glycol di-n-propyl ether, dipropylene glycol dimethyl ether, dipropylene glycol monomethyl ether, dipropylene glycol mono-n-butyl ether, dipropylene glycol mono-n-propyl ether, dipropylene glycol mono-tert-butyl ether, dipropylene glycol di-tert-butyl ether, propylene glycol monoethyl ether, propylene glycol monomethyl ether, propylene glycol mono-n-propyl ether, propylene glycol monophenyl ether, propylene glycol mono-tert-butyl ether, propylene glycol diphenyl ether, propylene glycol mono-n-butyl ether, tripropylene glycol monomethyl ether, and poly(allyl glycidyl ether), ketones such as acetone, methyl ethyl ketone, halogenated solvents such as methylene chloride or trichloromonofluoroethane, or others, such as benzyl alcohol, dibutyl phthalate, propylene glycol, tris(butoxyethyl) phosphate, for example.

The invention is to be illustrated using the following, non-limiting examples.

The solids content was determined generally by drying a defined amount of the aqueous polymer dispersion (approximately 1 g) to constant weight in a drying oven at 140° C., the dispersion being in an aluminum crucible having an internal diameter of approximately 5 cm. Two separate measurements were conducted. The figures reported in the examples represent the average of each pair of results.

The viscosity of the dispersions obtained was determined dynamically at 23° C. and a shear rate of 100 s$^{-1}$ in accordance with DIN EN ISO 3219.

Preparation of Aqueous Polymer Dispersions

EXAMPLE 1 (E1)

A polymerization vessel equipped with metering devices and temperature regulation was charged at 20 to 25° C. (room temperature) under a nitrogen atmosphere with 290.9 g of deionized water and 12.0 g of a 15% strength by weight aqueous solution of sodium lauryl sulfate, and this initial charge was heated to 80° C. with stirring. When that temperature had been reached, 25.7 g of a 7% strength by weight aqueous solution of sodium peroxodisulfate were added and the batch was stirred for two minutes. Subsequently, with the temperature maintained, feed stream 1 was metered in continuously over the course of 40 minutes at a constant flow rate. After the end of feed stream 1, 12 g of water were added to the polymerization mixture. The polymerization mixture was then left to react at 80° C. for 10 minutes more. After that, it was admixed with 3.1 g of a 3% strength by weight aqueous ammonia solution.

Subsequently, feed stream 2 was metered in continuously over the course of 90 minutes with a constant flow rate.

After the end of feed stream 2, 12 g of water were added to the polymerization mixture. The polymerization mixture was then left to react at 80° C. for a further 100 minutes.

Thereafter the aqueous polymer dispersion obtained was cooled to room temperature, admixed with 62.9 g of deionized water, and filtered through a 125 μm filter.

Feed Stream 1 (Homogeneous Mixture of):

76.2 g of deionized water 3.0 g of a 15% strength by weight aqueous solution of sodium lauryl sulfate 2.16 g of ethylhexyl thioglycolate 13.5 g of hydroxyethyl methacrylate 13.5 g of butyl acrylate 13.5 g of styrene 94.5 g of methyl methacrylate Feed Stream 2 (Homogeneous Mixture of):

124.4 g of deionized water 6.0 g of a 15% strength by weight aqueous solution of sodium lauryl sulfate 157.5 g of n-butyl acrylate 157.5 g of methyl methacrylate The aqueous polymer dispersion obtained had a solids content of 42.5% by weight. The weight-average particle diameter of the polymer dispersion was 78 nm.

The aqueous polymer dispersion obtained had a hydroxyl number of 6 mg KOH/g and an acid number of 0.3 mg KOH/g.

COMPARATIVE EXAMPLE 1 (C1)

The preparation of comparative example 1 was the same as for the preparation of example 1, with the difference that, in feed stream 1, 13.5 g of methacrylic acid were used in place of the hydroxyethyl methacryate, and that, instead of 3.1 g of a 3% strength by weight aqueous ammonia solution, 5.0 g of a 3% strength by weight aqueous ammonia solution were added.

The aqueous polymer dispersion obtained had a solids content of 42.6% by weight. The weight-average particle diameter of the polymer dispersion was 74 nm.

When a determination is made of the water absorption (immersion of the films in water over 24 h and determination of the change in weight) of the free films obtainable by pouring the dispersion into a rubber mold and drying it to constant weight at room temperature, it is found that the water absorption for example 1 is well below that of comparative example 1 (for C1, greater than 30%, based on the weight of the dry film; for B1, less than 10%, based on the weight of the dry film).

EXAMPLE 2 (E2)

A polymerization vessel equipped with metering devices and temperature regulation was charged at 20 to 25° C. (room temperature) under a nitrogen atmosphere with 289.6 g of deionized water and 12.0 g of a 15% strength by weight aqueous solution of sodium lauryl sulfate, 1.1 g of 25% strength by weight aqueous ammonia solution and this initial charge was heated to 80° C. with stirring. When that temperature had been reached, 25.7 g of a 7% strength by weight aqueous solution of sodium peroxodisulfate were added and the batch was stirred for two minutes. Subsequently, with the temperature maintained, feed stream 1 was metered in continuously over the course of 40 minutes at a constant flow rate. After the end of feed stream 1, the polymerization mixture was left to react at 80° C. for 10 minutes more. After that, 13.5 g of a 2% strength by weight aqueous ammonia solution were metered continuously into the polymerization mixture over the course of 10 minutes at a constant flow rate.

Subsequently, feed stream 2 was metered in continuously over the course of 90 minutes with a constant flow rate.

After the end of feed stream 2, 12 g of water were added to the polymerization mixture. The polymerization mixture was then left to react at 80° C. for a further 100 minutes.

Thereafter the aqueous polymer dispersion obtained was cooled to room temperature, admixed with 57.8 g of an 18.7% strength by weight aqueous solution of adipic dihydrazide, and filtered through a 125 μm filter.

Feed Stream 1 (Homogeneous Mixture of):
33.0 g of deionized water
3.0 g of a 15% strength by weight aqueous solution of sodium lauryl sulfate
2.16 g of ethylhexyl thioglycolate
54.0 g of a 20% strength by weight aqueous solution of diacetoneacrylamide
10.8 g of butanediol monoacrylate
13.5 g of n-butyl acrylate
13.5 g of styrene
86.4 g of methyl methacrylate Feed Stream 2 (Homogeneous Mixture of):
116.5 g of deionized water
6.0 g of a 15% strength by weight aqueous solution of sodium lauryl sulfate
54.0 g of a 20% strength by weight aqueous solution of diacetoneacrylamide
217.8 g of n-butyl acrylate
86.4 g of methyl methacrylate The aqueous polymer dispersion obtained had a solids content of 42.5% by weight. The weight-average particle diameter of the polymer dispersion was 91 nm. The viscosity was found to be 39 mPas.

COMPARATIVE EXAMPLE 2 (C2)

A polymerization vessel equipped with metering devices and temperature regulation was charged at 20 to 25° C. (room temperature) under a nitrogen atmosphere with
289.6 g of deionized water and
12.0 g of a 15% strength by weight aqueous solution of sodium lauryl sulfate,
1.1 g of a 25% strength by weight aqueous ammonia solution
and this initial charge was heated to 80° C. with stirring. When that temperature had been reached, 25.7 g of a 7% strength by weight aqueous solution of sodium peroxodisulfate were added and the batch was stirred for two minutes. Subsequently, with the temperature maintained, feed stream 1 was metered in continuously over the course of 150 minutes at a constant flow rate. After that, 13.5 g of a 2% strength by weight aqueous ammonia solution were metered continuously into the polymerization mixture over the course of 10 minutes at a constant flow rate.

Subsequently, 12 g of water were added to the polymerization mixture. The polymerization mixture was then left to react at 80° C. for a further 90 minutes.

Thereafter the aqueous polymer dispersion obtained was cooled to room temperature, admixed with 57.8 g of an 18.7% strength by weight aqueous solution of adipic dihydrazide, and filtered through a 125 μm filter.

Feed Stream 1 (Homogeneous Mixture of):
149.5 g of deionized water
9.0 g of a 15% strength by weight aqueous solution of sodium lauryl sulfate
2.16 g of ethylhexyl thioglycolate
108.0 g of a 20% strength by weight aqueous solution of diacetoneacrylamide
10.8 g of butanediol monoacrylate
231.3 g of n-butyl acrylate
13.5 g of styrene
172.8 g of methyl methacrylate The aqueous polymer dispersion obtained had a solids content of 42.6% by weight. The weight-average particle diameter of the polymer dispersion was 77 nm. The viscosity was found to be 75 mPas.

Using this polymer dispersion, in contrast to that prepared according to example 2, the only films obtained were hazy.

EXAMPLE 3 (E3)

A polymerization vessel equipped with metering devices and temperature regulation was charged at 20 to 25° C. (room temperature) under a nitrogen atmosphere with
290.9 g of deionized water and
14.4 g of Adeka® Reasoap® SR-1025 (Asahi Denka Co)
and this initial charge was heated to 80° C. with stirring. When this temperature had been reached, 25.7 g of a 7% strength by weight aqueous solution of sodium peroxodisulfate were added and the batch was stirred for two minutes. Subsequently, with the temperature maintained, feed stream 1 was metered in continuously over the course of 40 minutes with a constant flow rate. After the end of feed stream 1, 12.0 g of deionized water were added to the polymerization mixture. The polymerization mixture was then left to react at 80° C. for 10 minutes more. Thereafter, 1.9 g of a 3% strength by weight aqueous ammonia solution was metered continuously into the polymerization mixture over the course of 10 minutes at a constant flow rate.

Subsequently, over the course of 90 minutes and with a constant flow rate, feed stream 2 was metered in continuously. 40 minutes after the start of feed stream 2, and in parallel with the ongoing feed stream 2, 0.9 g of a 3% strength by weight aqueous ammonia solution were metered continuously into the polymerization mixture over the course of 10 minutes at a constant flow rate.

After the end of feed stream 2, 12 g of water were added to the polymerization mixture. The polymerization mixture was then left to react at 80° C. for 90 minutes more. Thereafter, 1.7 g of a 5% strength by weight aqueous ammonia solution were metered continuously into the polymerization mixture over the course of 10 minutes at a constant flow rate.

Subsequently, the aqueous polymer dispersion obtained was cooled to room temperature, admixed with 40.9 g of 13.2% strength by weight aqueous solution of adipic dihydrazide, and filtered through a 125 μm filter.

Feed Stream 1 (Homogeneous Mixture of):
33.1 g of deionized water
3.6 g of Adeka® Reasoap® SR-1025 (Asahi Denka Co)
2.16 g of ethylhexyl thioglycolate
54.0 g of a 20% strength by weight aqueous solution of diacetoneacrylamide
10.8 g of hydroxyethyl methacrylate
13.5 g of styrene
99.9 g of methyl methacrylate Feed Stream 2 (Homogeneous Mixture of):
162.8 g of deionized water
7.2 g of Adeka® Reasoap® SR-1025 (Asahi Denka Co)

217.8 g of n-butyl acrylate 97.2 g of methyl methacrylate

The aqueous polymer dispersion obtained had a solids content of 42.6% by weight. The weight-average particle diameter of the polymer dispersion was 97 nm. The viscosity was found to be 42 mPas.

EXAMPLE 4 (E4)

A polymerization vessel equipped with metering devices and temperature regulation was charged at 20 to 25° C. (room temperature) under a nitrogen atmosphere with 493.5 g of deionized water and 9.0 g of BASF Lipamin OK and this initial charge was heated to 70° C. with stirring. When that temperature had been reached, 154.3 g of a 7% strength by weight aqueous solution of Azostarter V50 azo initiator (from Wacker Chemicals GmbH) were added and the batch was stirred for five minutes.

Subsequently, with the temperature maintained, feed stream 1 was metered in continuously over the course of 40 minutes at a constant flow rate. After the end of feed stream 1, 24.0 g of deionized water were added to the polymerization mixture. The polymerization mixture was then left to react at 70° C. for 20 minutes more. Subsequently, feed stream 2 was metered in continuously over the course of 90 minutes with a constant flow rate.

After the end of feed stream 2, 24 g of water were added to the polymerization mixture. The polymerization mixture was then left to react at 70° C. for a further 100 minutes.

Thereafter the aqueous polymer dispersion obtained was cooled to room temperature, admixed with 115.5 g of an 18.7% strength by weight aqueous solution of adipic dihydrazide, and filtered through a 125 μm filter.

Feed Stream 1 (Homogeneous Mixture of):

66.0 g of deionized water 2.25 g of BASF Lipamin® OK 4.32 g of ethylhexyl thioglycolate 108.0 g of a 20% strength by weight aqueous solution of diacetoneacrylamide 21.6 g of butanediol monoacrylate 27.0 g of styrene 172.8 g of methyl methacrylate Feed Stream 2 (Homogeneous Mixture of):

285.9 g of deionized water 4.5 g of BASF Lipamin® OK 108.0 g of a 20% strength by weight aqueous solution of diacetoneacrylamide 435.6 g of n-butyl acrylate 172.8 g of methyl methacrylate The aqueous polymer dispersion obtained had a solids content of 41.6% by weight. The weight-average particle diameter of the polymer dispersion was 140 nm. The viscosity was found to be 10 mPas.

EXAMPLE 5 (E5)

The preparation of example 5 was as for the preparation of example 1, with the differences that, in feed stream 1, 85.5 g of n-butylacrylate instead of 13.5 g of n-butylacrylate, and 14.4 g of methyl methacrylate instead of 86.4 g of methyl methacrylate, were used; that, instead of 57.8 g of an 18.7% strength by weight aqueous solution of adipic dihydrazide, 45.0 g of a 12% strength by weight aqueous solution of adipic dihydrazide were used; and that feed stream 2 was composed of a homogeneous mixture of:

159.7 g of deionized water 6.0 g of a 15% strength by weight aqueous solution of sodium lauryl sulfate 315.0 g of ethylhexyl acrylate.

The aqueous polymer dispersion obtained had a solids content of 40.2% by weight. The weight-average particle diameter of the polymer dispersion was 93 nm. The viscosity of the resulting polymer dispersion was 73 mPas. Application of the dispersion, for example, by knifecoating to a glass plate (using a four-way bar-type applicator, wet film thickness 200 μm) and drying at room temperature for 24 hours produced a tacky film.

EXAMPLE 6 (E6)

The preparation of example 6 was as for the preparation of example 3, with the differences that, in the initial charge, 12.0 g of a 15% strength by weight aqueous solution of sodium lauryl sulfate instead of 14.4 g of Adeka® Reasoap® SR-1025, were used; that, instead of 40.9 g of a 13.2% strength by weight aqueous solution of adipic dihydrazide, 48.1 g of a 26.2% strength by weight aqueous solution of adipic dihydrazide were used; and that feed stream 1 was composed of a homogeneous mixture of:

77.0 g of deionized water 6.9 g of a 15% strength by weight aqueous solution of sodium lauryl sulfate 126.0 g of a 20% strength by weight aqueous solution of diacetoneacrylamide 9.0 g of methacrylamide 25.2 g of hydroxyethyl methacrylate 22.5 g of styrene 233.1 g of methyl methacrylate and feed stream 2 was composed of a homogeneous mixture of:

64.6 g of deionized water 2.7 g of a 15% strength by weight aqueous solution of sodium lauryl sulfate 135.0 g of n-butyl acrylate In addition, as a further difference, feed stream 1 was metered in at a uniform rate over 90 min rather than 40 min, and feed stream 2 was metered in at a uniform rate over 40 min rather than 90 min. The additions of 12.0 g of deionized water each took place following the ends of feed streams 1 and 2, while the addition of the aqueous ammonia solution took place at the same distance from the beginning of the reaction as in example 3.

The aqueous polymer dispersion obtained had a solids content of 42.4% by weight. The weight-average particle diameter of the polymer dispersion was 99 nm. The viscosity of the resulting polymer dispersion was 39 mPas.

EXAMPLE 7 (E7)

The preparation of example 7 was as for the preparation of example 6, with the differences that, in the initial charge, 6.0 g of a 15% strength by weight aqueous solution of sodium lauryl sulfate instead of 12.0 g of a 15% strength by weight aqueous solution of sodium lauryl sulfate, were used; that, in feed stream 2, 71.6 g of deionized water were used instead of 64.6 g, and 1.35 g of a 15% strength by weight aqueous solution of sodium lauryl sulfate instead of 2.7 g were used; and that feed stream 1 was composed of a homogeneous mixture of:

77.0 g of deionized water 3.45 g of a 15% strength by weight aqueous solution of sodium lauryl sulfate 126.0 g of a 20% strength by weight aqueous solution of diacetoneacrylamide 45.0 g of hydroxyethyl methacrylate 11.7 g of styrene 233.1 g of methyl methacrylate The aqueous polymer dispersion obtained had a solids content of 42.7% by weight. The weight-average particle diameter of the polymer dispersion was 102 nm. The viscosity of the resulting polymer dispersion was 23 mPas.

EXAMPLE 8 (E8)

The preparation of example 8 took place in the same way as the preparation of example 3, with the difference that feed stream 1 was composed of a homogeneous mixture of:

33.0 g of deionized water 3.0 g of a 15% strength by weight aqueous solution of sodium lauryl sulfate 2.16 g of ethylhexyl thioglycolate 54.0 g of a 20% strength by weight aqueous solution of diacetoneacrylamide 21.6 g of hydroxyethyl methacrylate 18.0 g of glycidyl methacrylate 13.5 g of styrene 71.1 g of methyl methacrylate A sample taken revealed that the product of the first stage had a weight-average molecular weight Mw of 13 900 g/mol and a weight-average particle diameter of 60 nm.

And feed stream 2 was composed of a homogeneous mixture of:

159.7 g of deionized water 6.0 g of a 15% strength by weight aqueous solution of sodium lauryl sulfate 315.0 g of n-butyl acrylate The aqueous polymer dispersion obtained had a solids content of 43.1% by weight. The weight-average particle diameter of the polymer dispersion was 143 nm. The viscosity of the polymer dispersion obtained was 21 mPas. The polymer dispersion obtained had a weight-average molecular weight, based on the sol fraction, of approximately 204 000 g/mol.

EXAMPLE 9 (E9)

The preparation of example 9 took place as for the preparation of example 8, with the difference that, in feed stream 1, 21.6 g of hydroxyethyl acrylate were used instead of 21.6 g of hydroxyethyl methacrylate.

The aqueous polymer dispersion obtained had a solids content of 42.9% by weight. The weight-average particle diameter of the polymer dispersion was 153 nm. The viscosity of the polymer dispersion obtained was 22 mPas.

EXAMPLE 10 (E10)

The preparation of example 10 took place in the same way as for the preparation of example 8, with the difference that feed stream 1 was composed of a homogeneous mixture of:

5.5 g of deionized water 0.51 g of a 15% strength by weight aqueous solution of sodium lauryl sulfate 0.36 g of ethylhexyl thioglycolate 9.0 g of a 20% strength by weight aqueous solution of diacetoneacrylamide 1.8 g of hydroxyethyl methacrylate 1.5 g of glycidyl methacrylate 2.25 g of styrene 15.2 g of methyl methacrylate and feed stream 2 was composed of a homogeneous mixture of:

214.8 g of deionized water 8.1 g of a 15% strength by weight aqueous solution of sodium lauryl sulfate 427.5 g of n-butyl acrylate In addition, as a further difference, feed stream 1 was metered in at a uniform rate over 5 minutes rather than 40 minutes, and feed stream 2 was metered in at a uniform rate over 125 minutes rather than 90 minutes. The additions of the 12.0 g of deionized water each took place following the ends of feed streams 1 and 2, and the additions of the aqueous ammonia solution took place at the same distance from the beginning of the reaction as in example 3, and, furthermore, instead of 40.9 g of a 13.2% strength by weight aqueous solution of adipic dihydrazide, 36.4 g of a 2.5% strength by weight aqueous solution of adipic dihydrazide were used.

The aqueous polymer dispersion obtained had a solids content of 43.0% by weight. The weight-average particle diameter of the polymer dispersion was 128 nm. The viscosity of the polymer dispersion obtained was 23 mPas.

EXAMPLE 11

The preparation of example 11 took place in the same way as for the preparation of example 7, with the difference that feed stream 1 was composed of a homogeneous mixture of:

178 g of deionized water 3.45 g of a 15% strength by weight aqueous solution of sodium lauryl sulfate 25.2 g of 100% diacetoneacrylamide (in solution in the water indicated)

45.0 g of 2-hydroxyethyl methacrylate 11.7 g of styrene 229 g of methyl methacrylate 4.50 g of glycidyl methacrylate The aqueous polymer dispersion obtained had a solids content of 42.1% by weight. The weight-average particle diameter of the polymer dispersion was 89 nm. A sampling after feed 1 showed the product of the first stage to have a weight-average molecular weight Mw of 151 000 g/mol.

EXAMPLE 12

The preparation of example 12 took place in the same way as for the preparation of example 7, with the difference that feed stream 1 was composed of a homogeneous mixture of:

178 g of deionized water 3.45 g of a 15% strength by weight aqueous solution of sodium lauryl sulfate 25.2 g of 100% diacetoneacrylamide (in solution in the water indicated)

45.0 g of 2-hydroxyethyl methacrylate 11.7 g of styrene 232 g of methyl methacrylate 0.90 g of allyl methacrylate The aqueous polymer dispersion obtained had a solids content of 42.0% by weight. The weight-average particle diameter of the polymer dispersion was 98 nm. A sampling after feed 1 showed the product of the first stage to have a weight-average molecular weight Mw of 100 000 g/mol.

EXAMPLE 13

A polymerization vessel equipped with metering devices and temperature regulation was charged at 20 to 25° C. (room temperature) under a nitrogen atmosphere with
- 456 g of deionized water and
- 6.30 g of 10% strength sodium hydroxide solution and this initial charge was heated to 80° C. with stirring. When that temperature had been reached, 17.1 g of a 21% strength by weight aqueous solution of sodium peroxodisulfate were added and the batch was stirred for two minutes. Subsequently, with the temperature maintained, feed stream 1 was metered in continuously over the course of 40 minutes at a constant flow rate. After the end of feed stream 1, the polymerization mixture was reacted further at 80° C. for 10 minutes. Thereafter, 5.40 g of 5% strength by weight aqueous ammonia solution were metered continuously into the polymerization mixture over the course of 10 minutes at a constant flow rate.

Subsequently, feed stream 2 was metered in continuously over the course of 90 minutes with a constant flow rate.

After the end of feed stream 2, 12 g of water were added to the polymerization mixture. The polymerization mixture was then left to react at 80° C. for a further 100 minutes.

Thereafter the aqueous polymer dispersion obtained was cooled to room temperature, admixed with 90.0 g of a 12% strength by weight aqueous solution of adipic dihydrazide, and filtered through a 125 µm filter.

Feed Stream 1 (Homogeneous Mixture of):
- 2.16 g of ethylhexyl thioglycolate
- 10.8 g of diacetoneacrylamide
- 10.8 g of 4-hydroxybutyl acrylate
- 13.5 g of styrene
- 86.4 g of methyl methacrylate
- 13.5 g of n-butyl acrylate Feed Stream 2 (Homogeneous Mixture of):
- 217.8 g of n-butyl acrylate
- 86.4 g of methyl methacrylate
- 10.8 g of diacetoneacrylamide The aqueous polymer dispersion obtained had a solids content of 43.7% by weight and a pH of 6.1. The weight-average particle diameter of the polymer dispersion was 174 nm.

EXAMPLE 14

A polymerization vessel equipped with metering devices and temperature regulation was charged at 20 to 25° C. (room temperature) under a nitrogen atmosphere with
- 764 g of deionized water and
- 37.3 g of a 15% strength by weight aqueous solution of sodium lauryl sulfate and
- 3.36 g of 25% strength by weight aqueous ammonia solution and this initial charge was heated to 80° C. with stirring. When that temperature had been reached, 160 g of a 7% strength by weight aqueous solution of sodium peroxodisulfate were added and the batch was stirred for two minutes. Subsequently, with the temperature maintained, feed stream 1 was metered in continuously over the course of 40 minutes at a constant flow rate. After the end of feed stream 1, the polymerization mixture was reacted further at 80° C. for 10 minutes. Thereafter, 42.0 g of 2% strength by weight aqueous ammonia solution were metered continuously into the polymerization mixture over the course of 10 minutes at a constant flow rate.

Subsequently, feed stream 2 was metered in continuously over the course of 90 minutes with a constant flow rate.

After the end of feed stream 2, the polymerization mixture was then left to react at 80° C. for a further 100 minutes.

Thereafter the aqueous polymer dispersion obtained was cooled to room temperature, admixed with 280 g of a 12% strength by weight aqueous solution of adipic dihydrazide, and filtered through a 125 µm filter.

Feed Stream 1 (Homogeneous Mixture of):
- 234 g of deionized water
- 9.33 g of a 15% strength by weight aqueous solution of sodium lauryl sulfate
- 33.6 g of 100% diacetoneacrylamide (in solution in the water indicated)
- 33.6 g of 4-hydroxybutylacrylate
- 42.0 g of styrene
- 269 g of methyl methacrylate
- 33.6 g of n-butyl acrylate Feed Stream 2 (Homogeneous Mixture of):
- 507 g of deionized water
- 18.7 g of a 15% strength by weight aqueous solution of sodium lauryl sulfate
- 33.6 g of 100% diacetoneacrylamide (in solution in the water indicated)
- 678 g of n-butyl acrylate
- 269 g of methyl methacrylate The aqueous polymer dispersion obtained had a solids content of 41.7% by weight and a pH of 9.5. The weight-average particle diameter of the polymer dispersion was 120 nm.

USE EXAMPLES

Application of the corrosion control varnish/preparatory work for the salt spray test The test formulations were diluted with fully demineralized (DI) water to the desired viscosity and drawn down onto a cleaned deep-drawn metal sheet (200×80×0.9 mm) using a four-way coating bar; the slot size here is selected so as to produce a dry film thickness of 60-85 µm. After drying, the reverse of the metal test sheet was protected from corrosion by application of a solvent-based varnish, and by taping off at the edges with Tesa-Film. Finally, on the side coated with the primer under test, the metal test sheet was inscribed down to the substrate, using a scoring implement. In the case of clearcoats, no scoring was carried out.

Clearcoats (1-Component)

Formulation F1:
100 g dispersion, 9 g butyl diglycol, 0.15 g BYK® 346, 0.65 g 1:1 mixture of DI water and corrosion inhibitor L1 (flash rust inhibitor).

Formulation F2 (Without Film-Forming Assistant):
100 g dispersion, 0.15 g BYK 346, 0.65 g 1:1 mixture of DI water and corrosion inhibitor L1 (flash rust inhibitor)

| Dispersion | Formulation | Hours in salt spray test until damage occurs |
| --- | --- | --- |
| Example 14 | F1 | 720 h |
| Example 14 | F2 | 720 h |
| Joncryl ® OH 8312 | F1 | 24 h |
| Joncryl ® OH 8312 | F2 | no suitable filming without solvent |
| Acronal ® PRO761 | F1 | 680 h |
| Acronal ® PRO761 | F2 | no suitable filming without solvent |
| Worlee Cryl ® 7137 | F1 | 170 h |
| Worlee Cryl ® 7137 | F2 | no suitable filming without solvent |

Acronal® PRO 761 from BASF is a self-crosslinking styrene acrylate dispersion having a solids content of approximately 50% by weight, viscosity of 23° C. (Brookfield) around 325 mPa·s, pH approximately 9.3, and a minimum film formation temperature of approximately 22° C.

Joncryl® 8312 from BASF is a styrene acrylate dispersion, solids content 45% (in water), viscosity at 25° C. (Brookfield) 360 mPa·s, hydroxyl number of 100 mg/KOH/g, pH approximately 2.7, acid content (based on solids) 9, and a minimum film formation temperature of approximately 48° C.

WorleeCryl® 7137 from Worlée is a styrene acrylate dispersion having a nonvolatile content to DIN EN ISO 3251 of 42%±1, pH (DIN ISO 976) of 7.5-8.5, viscosity at 20° C., Brookfield (DIN EN ISO 2555) max. 200 mPa·s with an anionic emulsifier system, minimum film formation temperature (ISO 2115) around 28° C.

Clearcoats (2-Component)
Example B1 (with Crosslinker):
100 g dispersion from example 14, 9 g butyldiglycol, 0.15 g BYK® 346, 0.65 g 1:1 mixture of DI water and corrosion inhibitor L1 (flash rust inhibitor). For this purpose, the crosslinker used was Luwipal® 072 (methanol-etherified melamine-formaldehyde resin in isobutanol from BASF, Ludwigshafen, 73%-77% nonvolatile fraction, acid number <1 mg KOH/g, free formaldehyde content≦1.0% by weight), proportion relative to the dispersion: 7 parts dispersion, 3 parts crosslinker (solids to solids)

Comparative Example CE1 (without Crosslinker):
100 g dispersion from example 14, 0.15 g BYK® 346, 0.65 g 1:1 mixture of DI water and corrosion inhibitor L1 (flash rust inhibitor)

Drying:
20 min at 130° C.+7 days at room temperature

|  | Example B1 | Comparative Example CE1 |
| --- | --- | --- |
| Acetone, double rubs | >200 | 90 |
| Gloss (20/60°) | 89/95 | 27/71 |
| Haze | 45 | 490 |
| Pendulum damping after 7/14 days | 29/30 | 7/7 |
| Hours in salt spray test until damage occurs | 720 | 720 |

Pigmented Systems
Formulation F3:
401.77 g of aqueous polymer dispersion from example 14 (41.7% solids content) are admixed with 1.32 g of BYK® 022 (defoamer from Byk), after which a mixture consisting of 0.36 g of Lutensit® A-EP (dispersant from BASF), 6.6 g of concentrated ammonia and 35.16 g of water is added by means of a Dispermat. With stirring, a mixture of 4.32 g of phenoxypropanol (film-forming assistant) and 4.32 g of benzine 180-210° C. (film-forming assistant) is incorporated. Subsequently 51 g of Bayferrox® 130 M (iron oxide pigment from Bayer), 21.6 g of talc 20 M 2 (filler), 38.3 g of calcium carbonate, and 76.68 g of Litopone® L (30% ZnS) (filler based on barium sulfate+zinc sulfide) are added. The overall mixture is dispersed for at least 30 minutes with glass beads (ø 3 mm). Subsequently, with continued stirring, a further 1.14 g of BYK® 022 and also 2.22 g of a 1:1 mixture of DI water and corrosion inhibitor L1 (flash rust inhibitor) are added, and the glass beads are removed by sieving. Lastly, the batch is admixed with a mixture of 2.22 g of Collacral® PU 85 (25%) (polyurethane-based thickener) and 7.92 g of butyl glycol (solvent) and, optionally, the pH is adjusted to around 9.5 using concentrated ammonia. This gives a corrosion control primer having a pigment/volume concentration (PVC) of 23%.

Formulation F4:
similar to F3 but without film-forming assistants phenoxypropanol and benzine 180-210° C.

Formulation F5:
similar to F3 but with Joncryl® 1522 instead of the dispersion from example 14. Joncryl® 1522 has a solids content of 45.1%, and the formulation was adapted such that the amount of polymer obtained was the same as in formulations F3 and F4. Therefore, in F5, 372.37 g of Joncryl® 1522 were used. The remainder of the formulation remained the same.

| Dispersion | Formulation | Hours in salt spray test until damage occurs |
| --- | --- | --- |
| Example 14 | F3 | 410 |
| Example 14 | F4 | 510 |
| Joncryl 1522 | F5 | 72 |

Joncryl® 1522 from BASF is a polymer dispersion having a solids content of 45%, a pH of 9.0 and a viscosity of 400 mPas, a glass transition temperature of approximately 34° C., and a minimum film formation temperature of approximately 26° C.

The invention claimed is:
1. A one- or two-component coating composition comprising at least one polymer dispersion obtained by at least two-stage emulsion polymerization of, in a first stage,
   (A1) at least one alkyl(meth)acrylate,
   (B1) optionally at least one vinylaromatic having up to 20 C atoms,
   (C1) at least one hydroxyalkyl(meth)acrylate,
   (D1) optionally at least one free-radically polymerizable compound selected from the group consisting of ethylenically unsaturated nitriles having up to 20 C atoms, vinyl esters of carboxylic acids containing up to 20 C atoms, vinyl halides having up to 10 C atoms, and vinyl ethers of alcohols containing 1 to 10 C atoms,
   (E1) optionally at least one α,β-ethylenically unsaturated carboxylic acid,
   (F1) optionally at least one crosslinker,
   (G1) optionally at least one compound selected from the group consisting of 2-(2-oxoimidazolidin-1-yl)ethyl (meth)acrylate, ureidoethyl(meth)acrylate, acetoacetoxyethyl acrylate, acetoacetoxypropyl methacrylate, acetoacetoxybutyl methacrylate, 2-(acetoacetoxy)ethyl methacrylate, diacetoneacrylamide (DAAM), and diacetonemethacrylamide,
   (H1) optionally at least one compound having a (meth) acrylate group and an epoxy group, and
   (I1) optionally at least one α,β-ethylenically unsaturated carboxamide,
   in the presence of at least one initiator and optionally in the presence of at least one emulsifier and also, optionally, in the presence of at least one regulator wherein a copolymer is obtained,
   with the proviso that said copolymer obtained from the first stage has
      an acid number of not more than 10 mg KOH/g polymer,
      a hydroxyl number of 2 to 100 mg KOH/g polymer,
      a particle size of 20 to 350 nm, and
      a weight-average molecular weight of 5000 to 200 000 g/mol, and the sum of the monomers (C1) and (I1) in said first stage is from 0.5% to 20% by weight, followed by a free-radical polymerization, in a subsequent stage, in the presence of the copolymer prepared in the first stage, of (A2) at least one alkyl(meth)acrylate, (B2) optionally at least one vinylaromatic having up to 20 C atoms, (C2) optionally at least one hydroxyalkyl(meth)acrylate, (D2) optionally at least one free-radically polymerizable compound selected from the group consisting of ethylenically unsaturated nitriles having up to 20 C atoms, vinyl esters of carboxylic acids containing up to 20 C atoms, vinyl halides having up to 10 C atoms, and vinyl ethers of alcohols containing 1 to 10 C atoms, (E2) optionally at least one α,β-ethylenically unsaturated carboxylic acid, (F2) optionally at least one crosslinker, and (G2) optionally at least one compound selected from the group consisting of 2-(2-oxoimidazolidin-1-yl)ethyl (meth)acrylate, ureidoethyl(meth)acrylate, acetoacetoxyethyl acrylate, acetoacetoxypropyl methacrylate, acetoacetoxybutyl methacrylate, 2-(acetoacetoxy)ethyl methacrylate, diacetoneacrylamide (DAAM), and diacetonemethacrylamide, (H2) optionally at least one compound having a (meth) acrylate group and an epoxy group, and (I2) optionally at least one α,β-ethylenically unsaturated carboxamide, optionally followed by one or more further stages of a free-radical polymerization of at least one monomer, the amount of the at least one emulsifier being 0% to 3.5% by weight, based on the total amount of the free-radically polymerizable monomers metered into the free-radical polymerization in all the stages, with the proviso that the weight ratio of the sum of the monomers of the first stage (A1) to (I1) to the sum of the monomers of the subsequent stages (A2) to (I2) is from 5:95 to 70:30, the product obtained from the last stage has a particle size of 50 to 500 nm, the acid number of the product of the last stage is not higher than the acid number of the product of the first stage, and the hydroxyl number of the product of the last stage is not higher than the hydroxyl number of the product of the first stage, optionally at least one other binder, optionally at least one crosslinker selected from the group consisting of polyisocyanates and melamine-formaldehyde resins, optionally at least one pigment, optionally at least one corrosion inhibitor.

2. The coating composition according to claim 1, wherein the monomer (A2) is at least one monomer selected from the group consisting of methyl methacrylate, methyl acrylate, ethyl acrylate, n-butyl acrylate, 2-ethylhexyl acrylate, and 3-propylheptyl acrylate.

3. The coating composition according to either of the preceding claims, wherein the monomer (B2) is at least one monomer selected from the group consisting of styrene and α-methylstyrene.

4. The coating composition according to claim 1, wherein the monomer (C1) is at least one monomer selected from the group consisting of 2-hydroxyethyl(meth)acrylate, 2-hydroxypropyl(meth)acrylate, and 3-hydroxypropyl(meth)acrylate.

5. The coating composition according to claim 1, wherein a monomer (G1) is present and it is diacetoneacrylamide.

6. The coating composition according to claim 1, wherein an emulsifier is used and said emulsifier is an ionic emulsifier.

7. The coating composition according to claim 1, having a minimum film-forming temperature of not more than 5° C.

8. The coating composition according to claim 1, wherein the copolymer obtained from the first stage has a glass transition temperature of 40 to 150° C., and the product obtained from said subsequent stage has a glass transition temperature which is lower by at least 40° C.

9. The coating composition according to claim 1, wherein the copolymer obtained from the first stage has a glass transition temperature of not more than 0° C., and the product obtained from said subsequent stage has a glass transition temperature of not more than 0° C.

10. The coating composition according to claim 1, wherein a crosslinker is used and said crosslinker is a hydrophilically modified polyisocyanate.

11. The coating composition according to claim 1, wherein a crosslinker is used and said crosslinker is at least one melamine-formaldehyde resin selected from the group consisting of completely to highly methylolated and fully alkylated to highly alkylated resins, partially methylolated and highly alkylated resins, and low-methylolated resins.

12. A method of coating comprising applying the coating composition according to claim 1 to a surface of at least one of metals and alloys.

13. A method of controlling corrosion comprising applying the coating compositions according to claim 1 to a surface in need of light, medium or heavy duty corrosion control.

14. The coating composition according to claim 1, wherein a particle size of said copolymer obtained from said first stage is 30 to 300 nm.

15. The coating composition according to claim 1, wherein an emulsifier is used and said emulsifier is an anionic emulsifier.

16. The coating composition according to claim 1, wherein said composition comprises at least one corrosion agent.

* * * * *